United States Patent [19]
Bradley

[11] Patent Number: 5,860,008
[45] Date of Patent: Jan. 12, 1999

[54] METHOD AND APPARATUS FOR DECOMPILING A COMPILED INTERPRETIVE CODE

[75] Inventor: Shayne P. Bradley, Vancouver, Wash.

[73] Assignee: Apple Computer, Inc., Cupetino, Calif.

[21] Appl. No.: 595,673

[22] Filed: Feb. 2, 1996

[51] Int. Cl.[6] .................................................. G06F 9/45
[52] U.S. Cl. .......................................... 395/704; 395/705
[58] Field of Search .................................... 395/703, 702, 395/704, 705, 707, 183.13, 183.14, 183.21; 371/3, 21.2, 22.2

[56] References Cited

U.S. PATENT DOCUMENTS

| | | | |
|---|---|---|---|
| 4,953,084 | 8/1990 | Meloy et al. | 371/19 |
| 5,371,747 | 12/1994 | Brooks et al. | 371/19 |
| 5,450,586 | 9/1995 | Kuzura et al. | 395/180 |
| 5,526,485 | 6/1996 | Brodsky | 395/183.14 |
| 5,657,438 | 8/1997 | Wygodny et al. | 395/180 |
| 5,777,489 | 7/1998 | Barbier et al. | 326/40 |

OTHER PUBLICATIONS

"Debugging and Exploration Tool for the Newton™ ", ViewFrame 1993.

*Primary Examiner*—Frantzy Poinvil
*Attorney, Agent, or Firm*—Beyer & Weaver, LLP

[57] ABSTRACT

A method and apparatus for decompiling a compiled, interpretive code characterized by the steps of creating an array of names and an array of literals from a plurality of compiled, interpretive code bytes and sequentially converting each code byte into a code fragment utilizing the code byte, the array of names, and the array of literals. Each code fragment is added to a code fragment array. Pattern matching is performed on the code fragment array to produce a source language listing describing a high-level functioning of the code bytes that is readily understood by a programmer. The pattern matching includes a linear sequence of matching steps that are ordered such that matching steps of less ambiguity are performed prior to related matching steps of greater ambiguity. The code fragment array is preferably searched for at least one pattern for each known construct used in the source language, and appropriate source language text is added for matched constructs. The process is preferably implemented on a frame-based pen computer system.

18 Claims, 10 Drawing Sheets

METHOD AND APPARATUS FOR DECOMPILING A COMPILED INTERPRETIVE CODE

TECHNICAL FIELD

The present invention relates generally to computer systems, and more particularly to decompilers for computer systems.

BACKGROUND ART

A computer system typically uses an operating system to control its resources. An operating system can interface with a user in several ways, including using command lines, such as in the MS-DOS operating system provided by Microsoft, Inc. or graphics user interfaces (GUI), such as in the Macintosh operating system provided by Apple, Inc. An operating system typically handles input, output and internal data by organizing the data into one or more formats which can be easily manipulated by the operating system.

Frame-based operating systems perform similar functions to other operating systems, but are distinguished in that data is stored in a specialized object format known as "frames." A frame is an object containing a collection of named data references called slots which can be accessed by the user. The frames are interconnected in a hierarchical structure, such as in a semantic network. Frame-based operating systems are well-suited for object-oriented programming languages, since objects can be directly associated with frames.

Various programming languages can be used to create programs to perform specified tasks. Some programming languages are of a compiled type, while others are of an interpretive type. A compiled program is first input by a user in a user-readable high-level source code format. The source code is then compiled by a compiler into machine-readable object code. At run time, the operating system uses the compiled code of the program linked with functions of the operating system to perform the desired tasks. A major advantage of compiled code is its relatively high speed of execution due to the fact that it is machine-readable.

Another type of programming language is an interpretive language. When implementing an interpretive language, an interpreter deciphers high-level source code into a machine language format. The interpreter therefore translates the source code into machine-readable code, links the program with other programs, and executes the instructions all at run time on an instruction-by-instruction basis. Thus, no separate listing of object code is generated and stored. Advantages of interpreted programming languages over compiled languages include portability to different types of computers and operating systems, since only the interpreter must be made specific for each type of computer. Other advantages include greater debugging abilities at run time, simpler implementation, and less storage space requirements for the interpreter.

Interpretive languages, such as BASIC, can be advantageous in offering a more direct link between a user's source code and the execution of the program. The user can often learn, for example, if a line of source code includes a syntax error as soon as the line is entered.

In some implementations of programming languages, a hybrid of compiled and interpreted languages is used. Source code is first compiled into an intermediate compiled code which is not machine code. An interpreter then interprets the intermediate compiled code at run time to execute the instructions of the program. Such a compiled, interpretive (intermediate) code is different from source code, since the intermediate code cannot typically be deciphered easily by humans as can source code. An advantage to compiling an intermediate code and interpreting the intermediate code is that greater execution speed is realized when interpreting intermediate code rather than interpreting source code. Memory space on the computer system is also conserved by using an interpreter, which is often important with portable computer systems. In addition, portability to different platforms is encouraged. For example, if a source code listing is compiled into an intermediate code, then only an interpreter is required for each different computer platform to execute the intermediate code.

Decompilers are programs which essentially reverse the compilation process. That is, object code is decompiled into the original source code which can then be easily read by a user. Decompilers are typically difficult to implement since specific knowledge about a compiler is required and it is often hard to reconstruct the exact language and logic of the source code. Decompilers are not needed for interpretive languages since the source code is already available, i.e. it was never compiled.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus which is engaged with a touch-sensitive screen of the computer. A pen-based computer system is commonly housed in a generally rectangular enclosure, and is provided with a dual-function display assembly that can serve as both an input device and an output device. When operating as an input device or "tablet", the display assembly senses the position and/or pressure of the tip of a stylus on the viewing screen and provides this positional or other information to the computer's central processing unit (CPU). When operating as an output device, the display assembly presents computer-generated images on the screen.

A pen-based computer available on the market is the Newton from Apple Computer, Inc. The Newton uses a frame-based operating system to create an object-oriented operating environment. NewtonScript™, provided by Apple Computer, Inc., is an object-oriented programming language which makes use of the frame system on the Newton. The Newton Tool Kit, also provided by Apple Computer, Inc., is an integrated environment for developing Newton applications. The NewtonScript language implements a hybrid of both compiled and interpreted languages. The compiler compiles NewtonScript source code into intermediate byte codes. These byte codes are then interpreted by the Newton operating system at run time and are executed as an interpretive language.

Debugging tools used for the Newton, such as Inspector™ by Apple Computer, Inc., can be used to debug the interpretive byte codes at execution time. This type of debugging is limited to checking and displaying variable and argument values, printing out contents of memory, and similar functions. Often, however, a user has need for the original source code of a compiled listing of byte codes to effectively debug a program. Such source code may not be available in many cases. Useful debugging tools which can provide source code are required if robust, well-written software code is to be produced for the computer.

A debug tools that has been marketed for the Newton is ViewFrame™, by Jason Harper. ViewFrame displays debugging information from a program which the Inspector debugger is not capable of displaying, such as during testing of serial communications. However, the ViewFrame program does not provide the original source code from a compiled byte code listing.

DISCLOSURE OF THE INVENTION

The present invention provides a method and apparatus for decompiling a compiled, interpretive (intermediate) code that includes compiled byte codes. These byte codes are interpreted at run time to execute the code and are usually indecipherable by a user. The present invention decompiles the byte codes into a high-level functional description which can be readily understood by a user.

A computer-implemented process for decompiling a compiled interpretive code into a source language includes the steps of creating an array of names and an array of literals from information stored in a compiled frame object, where the compiled frame object includes a collection of compiled, interpretive code bytes. Each code byte is sequentially converted into a code fragment utilizing the code byte, the array of names, and the array of literals, and each code fragment is added to a code fragment array. Next, pattern matching is performed on the code fragment array to produce a source language listing describing a high-level functioning of the code bytes. The pattern matching includes a linear sequence of matching steps that are preferably ordered such that matching steps of less ambiguity are performed prior to related matching steps of greater ambiguity. A stack structure is created to store values during the code fragment creation, and the array of names and the array of literals are indexed to retrieve a textual portion of the code fragments. The code fragment array is preferably searched for at least one pattern for each known construct used in the source language, where a scan direction is set and each code fragment in the code fragment array in the scan direction is added until a pattern is matched. Cleanup procedures are implemented after all known constructs have been matched in the code fragment array.

A hand-held decompiler for decompiling a compiled interpretive code into a source language includes an enclosure, a combination display screen and input tablet assembly supported by the enclosure, and a stylus associated with the input tablet. The decompiler includes a process implemented on computer hardware enclosed within the enclosure and coupled to the screen and input tablet. Compiled interpretive (intermediate) code is stored within the computer system.

A decompiler process decompiles the intermediate code into a source language that is readily understood by a programmer. The operating system of the computer system is preferably a frame-based system, and the intermediate code preferably includes byte codes.

The decompiler process includes a code fragment generator for generating a code fragment for each of the byte codes in the compiled interpretive code. The decompiler process also includes a code fragment array generator for generating a code fragment array from the code fragments. A pattern matcher is used for matching code fragments in the code fragment array with patterns which distinguish each type of construct used in the source language. The pattern matcher preferably first matches the constructs having less ambiguity, and includes a function text generator which adds source language text appropriate for each of the matched constructs.

A decompiler for a compiled interpretive code includes memory for storing compiled, interpretive code bytes, a code fragment array generator for converting the code bytes into a code fragment array and for storing the code fragment array in the memory, and a pattern matcher operating on the code fragment array to produce a source language describing the high-level functioning of the code bytes and for storing the source language in the memory. The code fragment array generator creates an array of names and an array of literals from the code bytes and creates a stack structure to create code fragments which make up the code fragment array. The pattern matcher matches code fragments in the code fragment array with patterns which distinguish each type of construct used in the source language, where constructs having more complex patterns are preferably matched first.

An advantage of the decompiler of the present invention is that it provides a source language listing from compiled, interpretive code bytes, which are typically indecipherable. The source language listing can be readily understood and analyzed by a user, and is thus useful for debugging, reverse engineering, and other similar tasks.

These and other advantages of the present invention will become apparent to those skilled in the art upon a reading of the following specification of the invention and a study of the several figures of the drawing.

BRIEF DESCRIPTION OF THE DRAWINGS

FIG. 5b is a conceptual representation of an argFrame frame residing in the argFrame slot of the frame shown in FIG. 5a;

BEST MODES FOR CARRYING OUT THE INVENTION

The present invention is well suited for frame-based computer systems such as the personal digital assistants and similar computers that are currently available. For the purposes of illustration, the invention will be described in connection with a pen-based system implementing an interpreted, object-oriented programming language.

However, the present invention is also suitable for other types of computer systems, such as desk top computer systems, minicomputer systems, etc. implementing an interpretive language having intermediate interpretive code.

Figure 1:
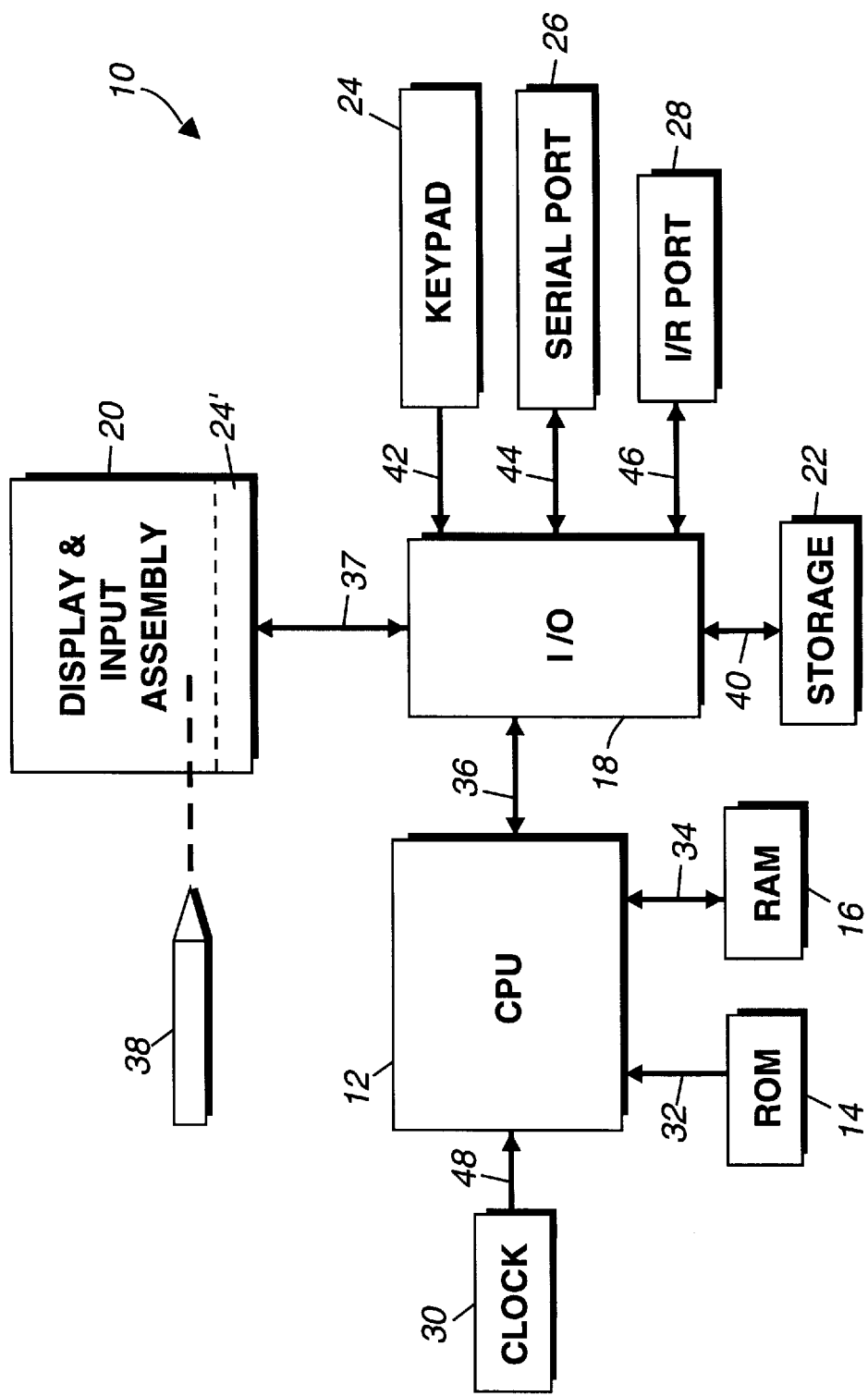
FIG. 1 is a block diagram of a the hardware of a decompiler system in accordance with the present invention.

As shown in FIG. 1, a pen-based computer system 10 in accordance with the decompiler system of the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30. A pen-based computer system including components similar to those described above is available from Apple Computer, Inc. of Cupertino, Calif. as the Newton® 120 Personal Digital Assistant (PDA). Other components can also be included, such as a sound system, power system, etc.

In operation, information is input into the pen-based computer system 10 by "writing" on the screen of display assembly 20 with a stylus 38. Information concerning the location of the stylus 38 on the screen of the display assembly 20 is input into the CPU 12 via a data bus 37 and I/O circuitry 18. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20. The CPU can use RAM for scratch pad memory and ROM to store instructions.

The present invention relates to machine readable media on which are stored program instructions for performing the invention on a computer. Such media includes by way of example memory devices such as RAM and ROM, as well as other media, such as magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 2:
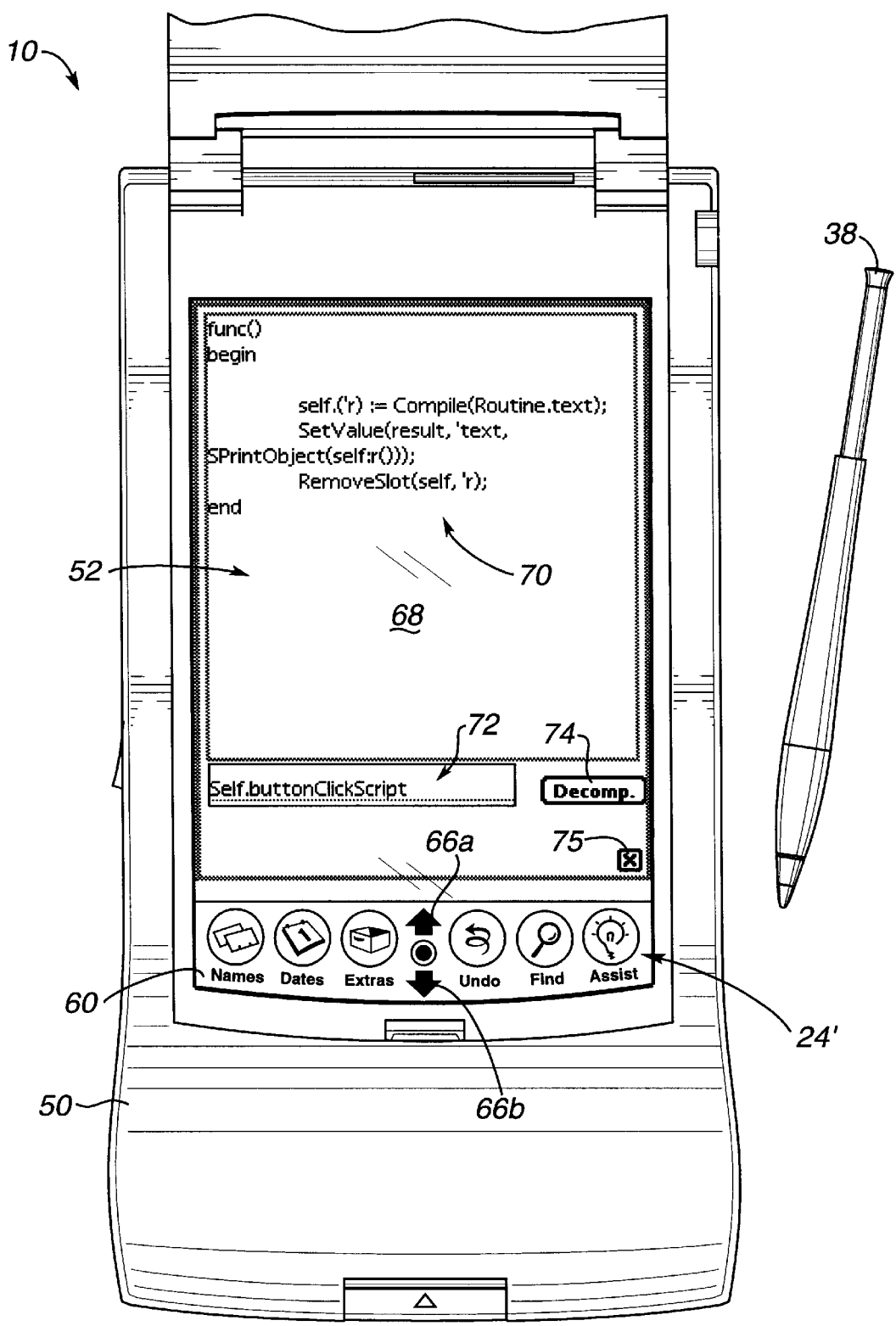
FIG. 2 is a top plan view of an enclosure and screen of the decompiler system of FIG. 1.

In FIG. 2, the pen-based computer system 10 of FIG. 1 is shown housed within a generally rectangular enclosure 50 that can be comfortably held in one hand. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the keypad 24'.

Images and views displayed on viewing screen 52, as well as other data units, are instances of a software construct known as an "object." As is well known to software programmers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well known texts which describe object oriented programming. See, for example, *Object Oriented Programming for the Macintosh*, by Kurt J. Schmucher, Hayden Book Company, 1986.

In the Newton 120, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985. A frame system which can be used in the present invention is described below with reference to FIG. 4 and in *The NewtonScript Programming Language*, by Chambers et al., Apple Computer, Inc., 1993, which is hereby incorporated by reference herein.

A frame system, as noted above, is implemented on the Newton personal digital assistants (PDA's) from Apple Computer, Inc. A primary programming language implemented on the Newton platform is called NewtonScript. NewtonScript is an object-oriented, dynamic programming language in which all data is stored as objects, or "typed" segments of data. A frame is one of the object types, and is the basic programming unit in NewtonScript. The NewtonScript programming language is fully described in *The NewtonScript Programming Language*, by Chambers et al. Additional information about the NewtonScript programming language and related topics can be found in the *Newton Programmer's Guide*, 1993 and the *Newton Toolkit User's Guide*, 1993, both published by Apple Computer, Inc. and both incorporated by reference herein; other Newton Toolkit books published by Apple Computer also include related information.

The NewtonScript language is input in a source code format, similar to other programming languages such as C and Pascal. In this format, the user can easily read the code and understand the functionality and operation of programs and functions. Before NewtonScript source code is implemented by a microprocessor and operating system, the source code is compiled into a listing of intermediate byte codes which are stored in a frame. These byte codes are simply a series of number codes representing the source code. To execute and implement the program or function, the Newton operating system interprets the compiled listing of byte codes at execution time and implements the instructions contained in the byte code listing. The byte codes can thus be viewed as an interpretive "language", i.e. a language that is interpreted at execution time. NewtonScript combines compile and interpret functions and is thus different from many other compiled languages, such as C and Pascal, which compile source code directly into low-level machine code that can be executed directly. NewtonScript is also different from common interpreted languages, such as BASIC, which interpret each instruction of source code directly at run time and execute each of those interpreted instructions without having an intermediate byte code listing.

As shown in FIG. 2, viewing screen 52 includes text and graphics of a decompiler interface 64 which allows the user to access the decompiler of the present invention. Window 68 displays the source code text 70 which has been decompiled from a listing of byte codes. In the described embodiment, the user can view portions of the source code listing 70 which are not displayed on the screen by activating scroll buttons 66a and 66b to scroll those portions onto the viewing screen 52. Window 72 displays the name of the function which included the byte code listing, or can display other information related to the function shown in window 68. Button 74 is the decompile button; when this button is selected by the user, the function listed in window 72 is decompiled and the source code is displayed in window 68. Close button 75 removes the decompiler interface from the viewing screen 52.

Figure 3:
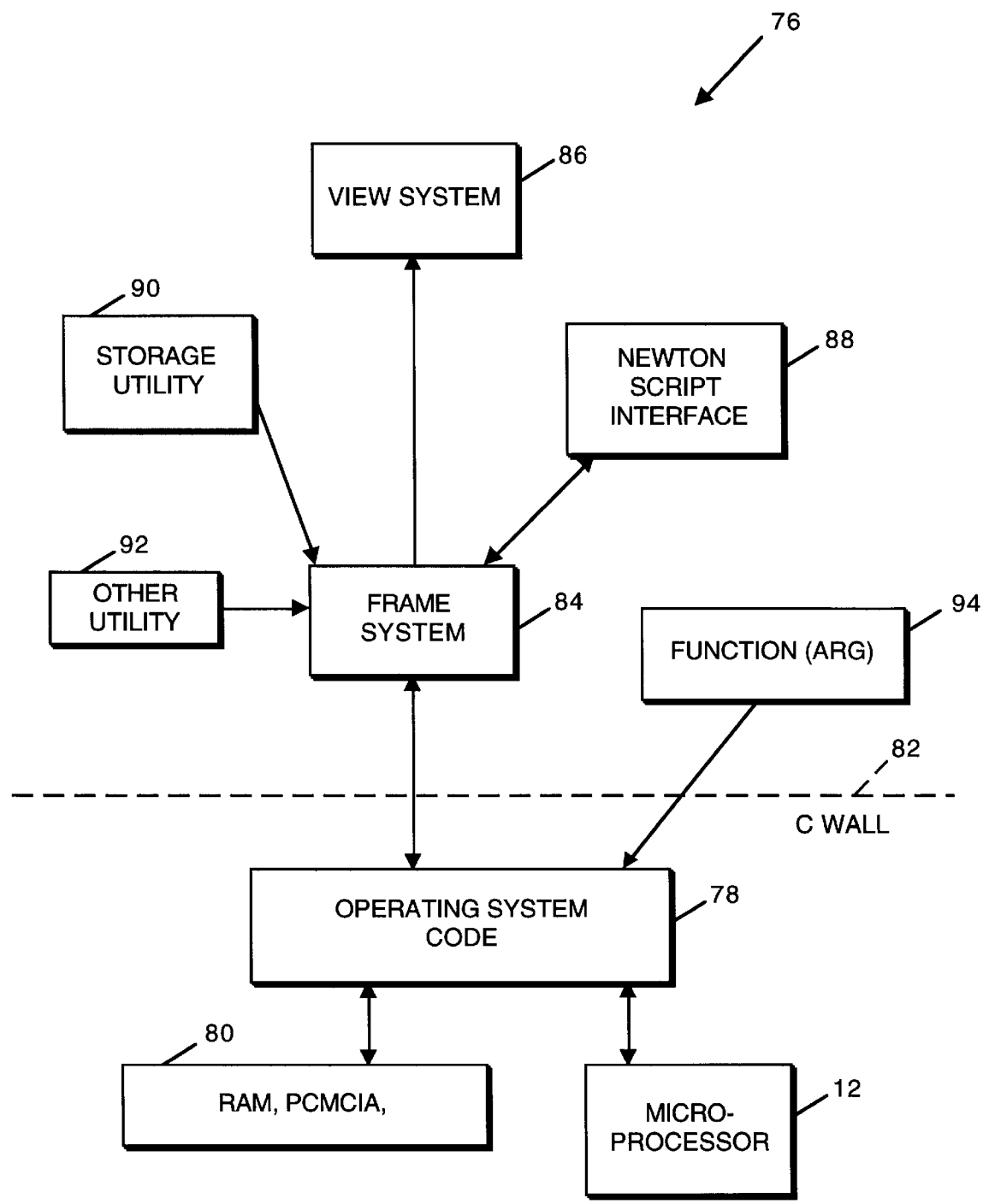
FIG. 3 is a block diagram of a frame-based operating system preferably used with the hardware of FIG. 1.

FIG. 3 is a block diagram illustrating an object oriented operating system 76 suitable for use with the present invention. Operating system code 78 is code that has been written in a high-level programming language, such as C, which was compiled by a C compiler to create machine code that implements the operating system functions and resources on the pen-based computer system 10. This operating system code is typically stored in storage devices 80, which can include such memory devices as RAM 16 and ROM 18, as well as storage devices such as a PCMCIA card. The operating system code is implemented by microprocessor (or CPU) 12, which reads the operating system instructions from storage devices 80 and executes those instructions. A suitable operating system for the present invention is the aforementioned Newton operating system.

In the described embodiment, a conceptual "C wall" 82 exists between the operating system code and higher, user-accessible functions which interface with the microprocessor 12 and storage devices 80 via the operating system code 78. C wall 82 represents a boundary as to which areas of the operating system 76 a user can access and manipulate. A typical user is not able to access and/or manipulate the operating system C code 78 in the embodiment shown.

Above the C wall 82 is a frame system 84. This system is part of an object-oriented programming environment which uses the aforementioned "frames" to describe and interrelated objects in the environment. The frame system communicates directly with the operating system code 78 to manipulate the operating system. However, a programmer must access operating system functions through the frame system or, as will be discussed subsequently, through the use of a defined system function. The frame system will be described in greater detail with reference to FIG. 4.

View system 86 is situated on a level above the frame system 84, i.e. the view system is implemented using frame system 84. In view system 86, various objects known as "views" are stacked on top of each other, like pages of paper on a desk top. These views include a root view (such as a base notepad) and virtually any number of views (within the limitations of the system) stacked on top of the root view.

In the described embodiment, the view system is a software routine which can return two pieces of information when the screen 52 is "tapped" (contacted) by a stylus (or other physical pointer). A first piece of information returned is the view which was tapped. A second piece of information returned is the position of the tap on the tapped view. This location information is often returned in the form of Cartesian (x-y) coordinates. The view system therefore handles much of the routine input work for the computer system 10. Taps by the stylus on non-active areas of the screen can be ignored by the view system. Likewise, inappropriate inputs on active areas of the screen can be ignored or can generate error conditions which may or may not be acted upon by the system.

The screen 52 can form a base or root layer, and, for example, a window associated with an application program forms a second layer above the base or root layer. A "template" can be positioned over the window object, which is a group of input areas; e.g., a child view of the parent window. Various input areas can be positioned over the template, and so on.

The view system can preferably automatically handle "taps" of the stylus 38 on the screen 52 by returning information concerning which object has been tapped and where on the object that the tap occurred. For example, a tap on the screen 52 can create an action for whatever application was displayed on that area of the screen. For example, the tap might activate a notepad on the screen 52. A different tap at a different location, such as on a window, could potentially cause an interaction with the application program being displayed within that window. A tap on a template could be part of a gesture formed on that template or it could be of part of a "drag" action to move the template to a different position on the screen. Object oriented programming and view system software are well suited for GUI inputs and outputs.

NewtonScript interface 88 is a program used to execute the intermediate NewtonScript code included in frame system 84. A user enters a program, for example, in the NewtonScript language, which uses particular syntax to manipulate frame objects as well as objects within the frame objects in the frame system. The interface 88 provides the means by which NewtonScript programs are run.

Storage utility 90 is a utility program that can be used with frame system 84 to store data. Such data includes the NewtonScript code executed by NewtonScript interface 88. Data from storage utility 90 can be written to a storage device, such as a hard disk drive, floppy disk, RAM, ROM, PCMCIA card, etc.

Other utility 90 encompasses a range of utilities that can be used with frame system 84. Such utilities include application programs, such as a note pad, address book, calendar program, and other programs. Additional utility programs that might be implemented in operating system 76 include modem and other peripheral controller programs, compression utilities for storing data more efficiently, system diagnostic programs, etc.

A system function 94 can be used to access the operating system code through the C wall 82 without accessing frame system 84. The function is called with input or output arguments (ARG). The function can be specified in a programming language that has been implemented on the computer system 10, such as NewtonScript. Using a function 94, aspects of the operating system code can be accessed. For example, each object in NewtonScript has a class associated with it. The classes of various objects, which are not normally available in the NewtonScript interface 88, can be accessed by calling a function called ClassOf (ARG), where the argument is the object for which the class information is desired. The function thus can be used to gain information about the operation of operating system code 78 as it is used behind the C wall 82.

Figure 4:
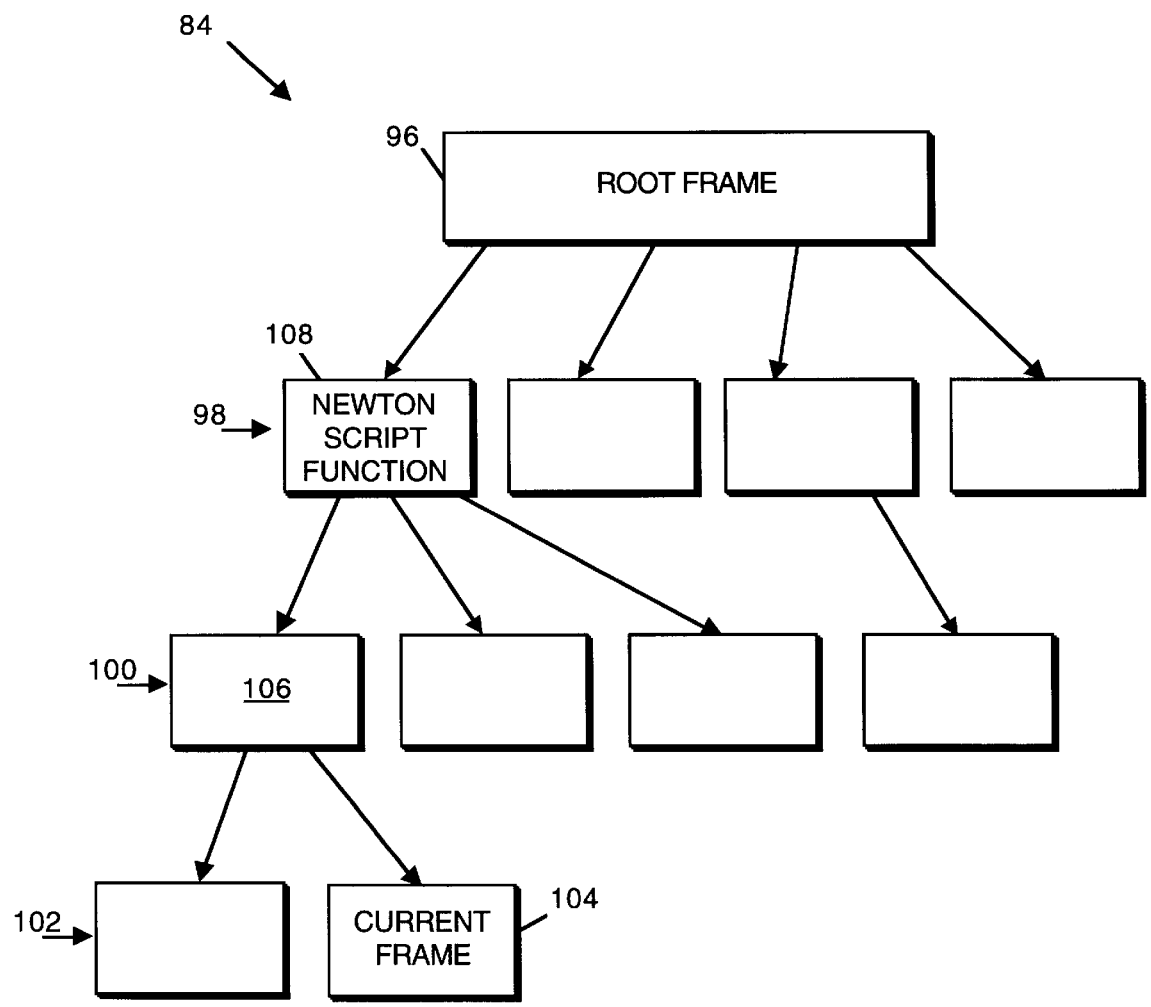
FIG. 4 is a block diagram illustrating the hierarchy of the frame operating system.

FIG. 4 is a block diagram of an example of a frame system 84 as it is used in the present invention. Frames are types of objects used with the NewtonScript interface. A frame system may take the form of a semantic network. As is well known to those skilled in the art, a semantic network is a knowledge representation system where unary predicates are treated like types and binary predicates are treated like attributes. Further, the types are arranged in a taxonomy where subassumption holds. See, Brachman and Leveseque, supra. Frame systems elaborate on the structure of types themselves and their attributes.

Objects used in the described embodiment are each assigned a "class", such as integer, string, Frame, CodeBlock, Picture, etc. The class may be used by the operating system code to identify the object and determine the types of data manipulated by the object. The class of a frame can be stored in a class slot which is examined by the operating system when determining the location of a particular frame. A compiled NewtonScript function is stored as a standard frame object with a class of "CodeBlock".

As shown in FIG. 4, root frame 96 is the basic frame level from which all other frames are ultimately derived. Frame level 98 includes four individual frames in the described example which are direct subframes of root frame 96. Frame level 100 includes four individual frames in the described example which are direct subframes of frame level 98. Frame level 102 includes two individual frames in the described embodiment which are direct subframes of frame level 100.

In the example of FIG. 4, assume that the currently accessed frame is frame 104 of frame level 102. Frame 104 is therefore the frame in which the operating system is currently executing instructions. For example, the Newton operating system interprets NewtonScript code and executes the code contained within a specific frame, such as current frame 104. If the executed code calls a separate NewtonScript function 94, that function is located so that arguments may be passed to and from the function. The operating system traverses the frame structure of the frame system in a "vertical" direction, i.e. from the current frame level to frame levels in the direction towards the root frame level. The frame system is thus traversed from frame 106 in frame level 100 to frame level 98. Assume that, in frame 108, the called NewtonScript function is found. The operating system thus traverses back through parent frames until a desired function or frame is found. This form of frame traversal is typical in a frame system described herein.

Figure 5A:
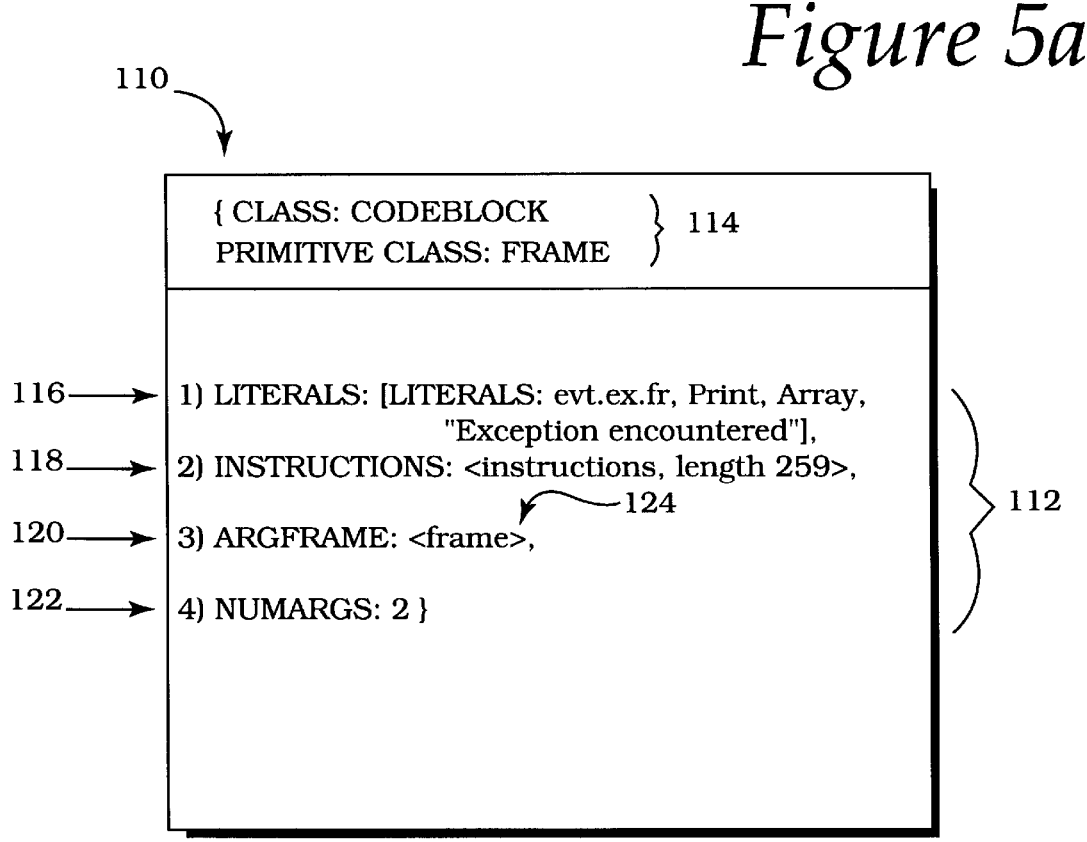
FIG. 5a is a conceptual representation of a compiled frame used in the method of the present invention.

FIG. 5a is an example of a frame structure that can be used in the present invention. Frame 110 is a frame object of a NewtonScript function or program whose source code has been compiled into byte codes and stored in a memory store such as RAM, ROM, a PCMCIA card, etc. Compiled NewtonScript functions are stored as frame objects having a class and a primitive class 114. In NewtonScript, frames have a class of "CodeBlock" and a primitive class of "Frame." The class of objects was mentioned previously with reference to FIG. 4. The "primitive class" is a more basic class of an object (which is behind the C Wall 82) and can include classes such as Binary, String, Number, and Frame. The class and primitive class are stored in slots available by calling the routines ClassOf( ) and PrimClassOf( ).

Frame 110 includes a number of frame slots 112. Any type of object can be stored in the frame slots 112, including numbers, strings, arrays, frames, or any datatype used in NewtonScript. A CodeBlock frame has a typical frame structure of four slots 112. The first of these slots is literals slot 116, which stores an array of objects of class "literal" which contains the literal values used in the compiled function, such as constant values and identifiers. The second slot is instructions slot 118, which stores a binary array of bytes of class "instructions." This array contains the compiled byte codes that are interpreted by the operating system when the program is executed by the CPU 12 as described above; an example of compiled byte codes are provided in Appendix B. The third slot is argFrame slot 120, which stores a frame object argFrame. The argFrame stores the individual arguments and variables used by the compiled function in slots of its own (see FIG. 5b). The fourth slot is numArgs slot 122, which includes the number of arguments passed as input and output parameters to and from the compiled function. The example of FIG. 5a shows the contents of the slots of a CodeBlock frame 110 generated from a source code example described below with reference to FIG. 6.

Figure 5B:
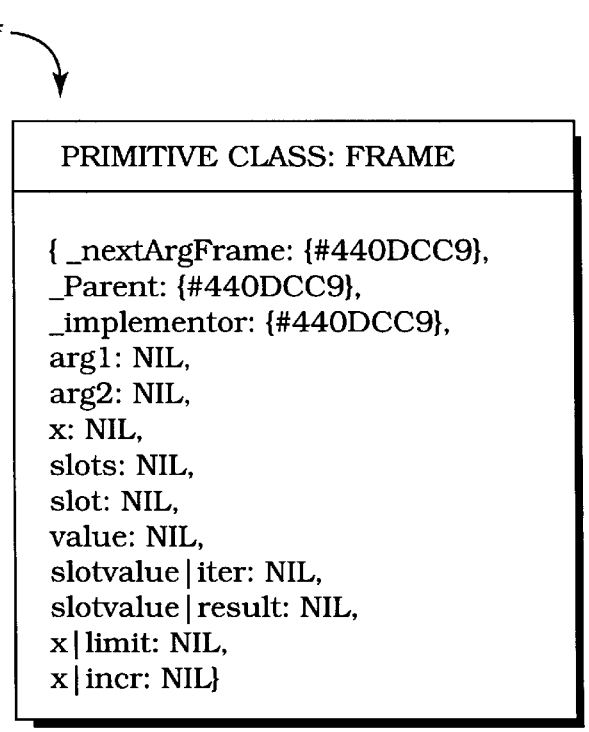

FIG. 5b is a pictorial representation of the frame object 124 stored in the argFrame slot 120 of frame 110 shown in FIG. 5a. The argFrame 124 stores the arguments which are passed to and from the NewtonScript function and the variables which are used by the function. Frame 124 includes a number of slots in the described embodiment. The first three slots are used internally by the runtime NewtonScript interpreter to provide proper closure and scoping for the routine, as is well known to those skilled in the art, and are not generally used by the current process. For example, "Parent" in the second slot refers to the parent frame of the ArgFrame. The slots in argFrame 124 after the first three slots hold the arguments passed to and from the compiled function. The number of slots holding arguments is equal to the numArgs number stored in slot 122 of the CodeBlock frame; these arguments are passed into this function. The remaining slots of ArgFrame 124 are used to hold variables that are used locally within the compiled NewtonScript function. FIG. 5b shows the contents of the slots of an ArgFrame generated from the Appendix A source code example described below with reference to FIG. 6. The variables "arg1" through "value" are arguments and variables used in the source code for the NewtonScript function. The variables "slotvalueliter" through "xlincr" are generated by the compiler for use by the interpreter at runtime.

Figure 6:
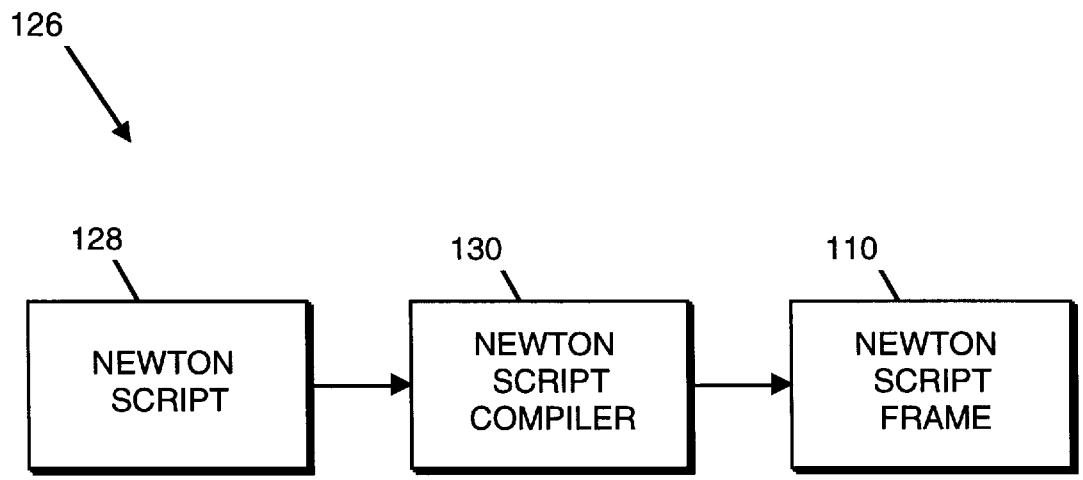
FIG. 6 is a flow diagram illustrating a prior art process for developing a compiled script frame from source language.

FIG. 6 is a block diagram 126 illustrating the components used in the prior art by which a NewtonScript function or program is compiled. NewtonScript source code 128 is a function or program in a high-level language that has been entered into the computer system by a user. Of course, source code from other similar programming languages can be used for compilers of those languages.

Appendix A shows an example of source code in the NewtonScript format. This source code example, and data generated from this source code, will be used throughout the text to explain the present invention. The variables "arg1" and "arg2" are arguments passed into and out of the function. Variables "x" and "slots" are local variables to the function.

The NewtonScript compiler 130 examines the entered source code function 128 and compiles the function into interpretive byte codes using the rules of syntax and constructs of the NewtonScript programming language. This compiler does not produce machine-readable object code, but instead produces intermediate byte codes which are interpreted by the operating system. The final product of NewtonScript compiler 130 is thus NewtonScript frame 110, which includes the byte codes and information from the NewtonScript function. The byte codes stored in frame 110 are interpreted and executed by the operating system at run time.

FIGS. 5a and 5b show the resulting CodeBlock frame 110 generated by the NewtonScript compiler from the source code example shown in Appendix A. Appendix B shows the byte code contents of the instructions array stored in Instructions slot 118 of the CodeBlock frame shown in FIG. 5a. Each line of the byte code array includes the byte offset followed by a colon, then the opcode byte, then any data values for that opcode. Appendix B also lists, for each byte code, the assembly instruction equivalent to that byte code.

Figure 7:
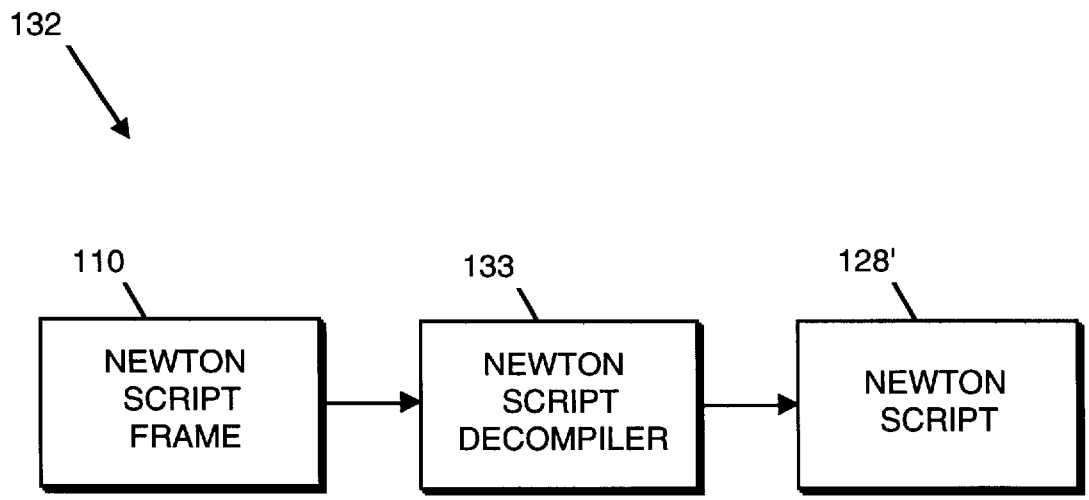
FIG. 7 is a flow diagram illustrating a process for decompiling a compiled script frame in accordance with the present invention.

FIG. 7 is a block diagram 132 illustrating the components and method of the present invention, which essentially reverses the process described in FIG. 6. A NewtonScript frame 110 which includes byte codes and information from a compiled function, such as the example shown in FIGS. 5a and 5b, has been stored within frame system 84. A NewtonScript decompiler 133 of the present invention is implemented by the CPU and operating system of the computer system. The decompiler 133 transforms the NewtonScript frame 110 into NewtonScript source code 128', which is a description of high-level functioning of the code bytes. The NewtonScript decompiled source code 128' that results from decompiler 133 is substantially the same as the original source code 128 of FIG. 6. If desired, the NewtonScript code 128 resulting from decompiler 133 may be compiled to a frame 110 once again by the process of FIG. 6. The process of accomplishing the decompilation by decompiler 133 is described below.

Appendix G shows a decompiled result of the present invention. The decompiled source code listing is substantially equivalent to the example source code shown in Appendix A. The source code of Appendix G can be re-compiled and executed if desired.

Figure 8:
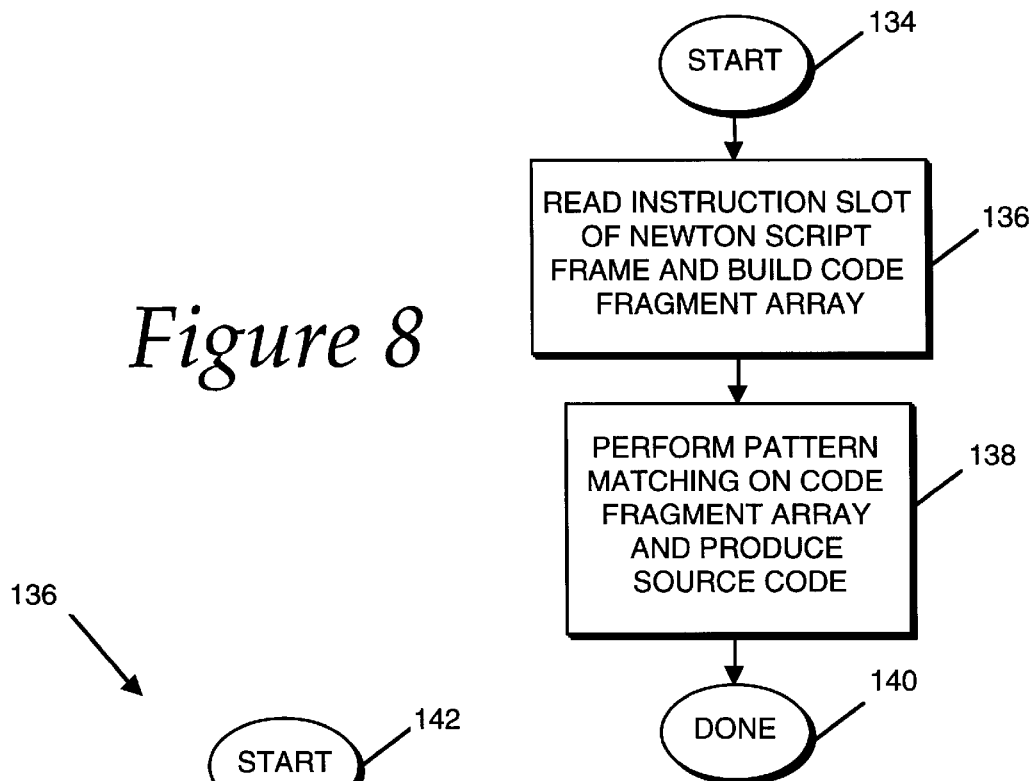
FIG. 8 is a flow diagram illustrating the decompiling process of FIG. 7.

FIG. 8 is a flow diagram illustrating the process used by NewtonScript decompiler 133 as shown in FIG. 7. The process begins at step 134, and, in a step 136, the instructions slot 118 of the NewtonScript frame is read. The instructions slot includes the byte codes of the compiled function, including binary operation instructions (opcodes) which are the instructions for the microprocessor to operate on the arguments and variable values; an example of the byte codes generated from the example of Appendix A are shown in Appendix B. From these byte code instructions in slot 118, the decompiler 133 builds a code fragment array, which is an array of text and parameters which the compiler creates to reconstruct the original source code. A portion of the decompiler known as a "code fragment array generator" implements the steps necessary to create a code fragment array. Step 136 is described in more detail with reference to FIG. 9. An example of a code fragment array is shown in Appendix D.

Once the code fragment array has been built in step 136, step 138 is implemented, in which a "pattern matcher" portion of the decompiler performs pattern matching on the code fragment array. The text and parameters in the code fragment array are matched to patterns, or conditions, which indicate the presence of specific constructs used in NewtonScript. The text of the constructs is created, and the literals, variables, and arguments are included to produce NewtonScript source code. The method used in step 138 is described in greater detail with respect to FIG. 12. Once the NewtonScript source code has been produced, the method is complete as indicated in step 140.

Figure 9:
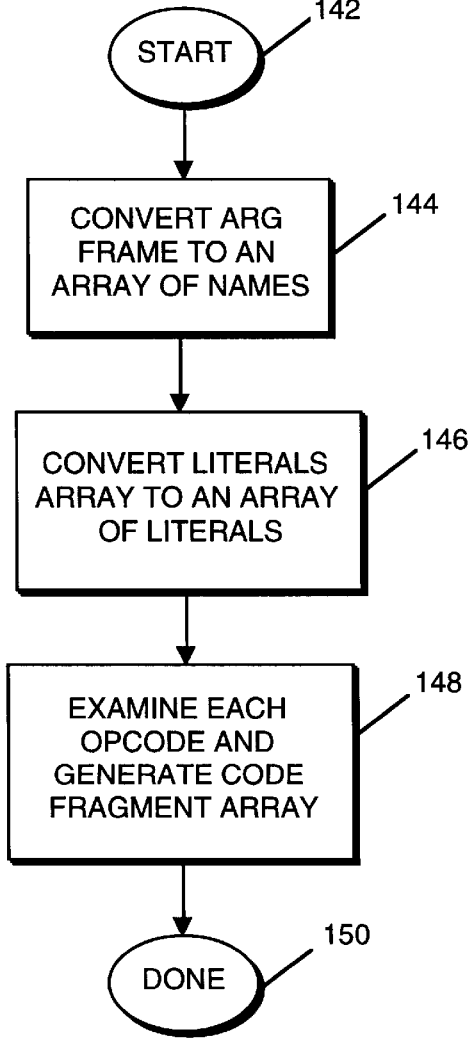
FIG. 9 is a flow diagram illustrating the "Read Instruction Slot and Build Code Fragment Array" step of FIG. 8.

FIG. 9 is a flow diagram illustrating the process of step 136 of FIG. 8, in which the Instructions slot of the NewtonScript frame is read and a code fragment array is built. The process begins at 142. In step 144, the Argframe 124 is processed to create an array of names. The names are strings of the system variables, arguments, and local variables stored in the slot 120 for the Argframe. In the example of Appendix A, the array from Argframe 124 shown in FIG. 5b would contain strings of the names shown in the Figure. This array is:

[args: "_nextArgFrame", "_Parent", "_implementor",
"arg1", "arg2", "x", "slots", "slot", "value", "slotvalue|iter",
"slotvalue|index", "slotvalue|result", "x|limit", "x|incr"].

These string names in the array of names are part of the textual representation of the code fragment array and are used to generate the resulting source code listing ("_nextArgframe", "_Parent" and "implementor" are generated and ignored).

After step 144, step 146 is implemented, in which the literals stored in slot 116 of frame 110 (see FIG. 5a) are converted to an array of literals. This array of literals is similar to the array of names created in step 144. Literals such as numeric constants, operators, and types are stored as strings in this step. Using the example of Appendix A, the array of literals created from the literals slot is:

[literals: "|evt.ex.fr|", "Print", "Array", "\"Exception encountered\""].

In the next step 148, the decompiler 130 examines each opcode stored in the instructions slot 118 and generates a code fragment that is appropriate for the opcode. A code fragment array is made by adding each code fragment to an array. The byte codes stored in the instructions slot and shown in Appendix B include opcodes and data bytes. The opcodes are byte codes representing instructions (such as "pop", "new-handlers", etc.) which instruct the interpreter to perform, and are one byte long as shown in Appendix B (two hexadecimal digits). The data bytes are associated with certain opcodes and represent data values used in the compiled program or function; the interpreter operates on the data bytes according to the associated opcode. In Appendix B, the data values are shown as two bytes (four hexadecimal digits). Each opcode must be identified by the decompiler to determine what actions are to be implemented in order to construct a code fragment for the opcode and add that code fragment to the code fragment array.

Each individual code fragment includes: the offset in bytes in the opcode array at which the code fragment started, the textual representation of the code fragment (which may or may not be used in the final source code text), a numeric value which is related to the operation that delimited the code fragment, and the actual operation that delimited the code fragment. The textual representation of the code fragment can be used either as a textual portion used in the final source code listing, or it can be used for debugging purposes. Debugging textual portions such as "CheckifDone" or "IncrVar" may be used to verify the content of the fragment array. The numeric value related to the operation that delimited the code fragment is used for opcodes such as "bra" (branch), where this numeric value would be the offset where the program flow would branch to. In many code fragments this number is zero. The actual operation that delimited the code fragment is a name for the operation which the code fragment represents. This name is usually similar to the opcode name, such as "pop," "setvar", etc., but may also be other names such as "brapop" (branch and pop).

In constructing a code fragment array, a separate array is created as a stack structure in memory to simulate the actual execution of the compiled byte codes. Three basic actions can be undertaken to create a code fragment, wherein one or more of these actions are implemented depending on the identified opcode. One action is to place a value on the stack structure for later retrieval. This value is typically a variable, constant, or address offset. A second action is to index the array of names and/or the array of literals which were created in steps 144 and 146 to obtain the fragment text. The array is indexed based on the data value after the opcode; for example, if the opcode being examined is 0x 7D, then the fifth name in the array of names is indexed and retrieved. Information from the stack may also be removed and combined with the retrieved name (fragment text) to create the code fragment. A third action is to add the code fragment to the code fragment array, which will be used in the reconstruction step (as detailed in FIG. 11) to rebuild the source code text. This code fragment can also include a "symbol" which is used in later steps to rebuild the source text; such symbols can include "bf" or "setvar", as described below. The examination and determination of the identification of an opcode, as well as the specific actions taken with respect to each opcode once it is identified, are described in greater detail with respect to FIG. 10.

Figure 10:
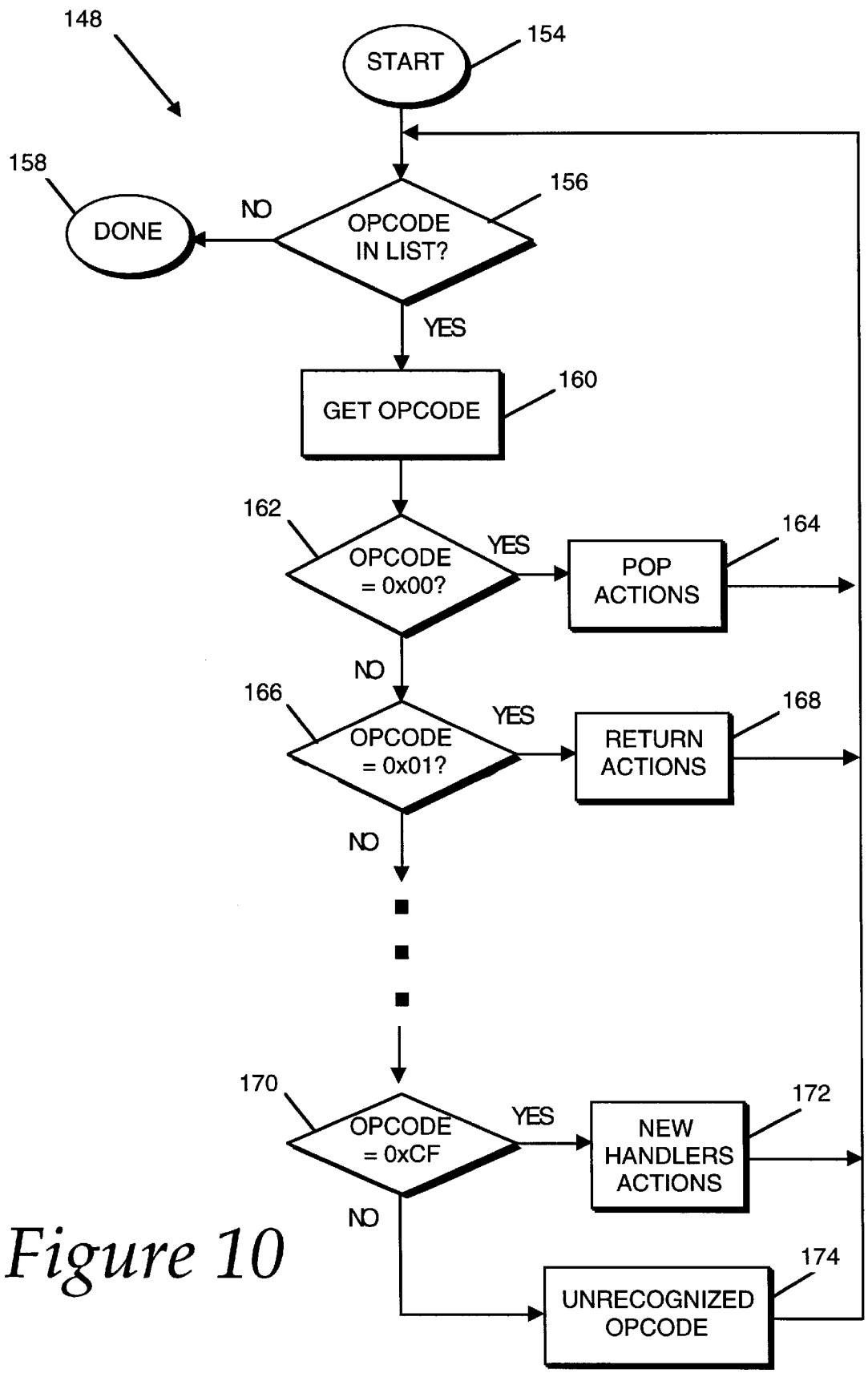
FIG. 10 is a flow diagram illustrating the "Examine Each Opcode and Generate Code Fragment Array" step of FIG. 9.

FIG. 10 is a flow diagram of step 148 of FIG. 9, in which each opcode is examined and a code fragment for each opcode is generated and added to the code fragment array. The process begins at 154, and, in a step 156, the decompiler checks if an unexamined opcode is in the Instructions byte code array. If no unexamined opcodes remain in the array, then the process is complete as indicated in step 158. If there still are unexamined opcodes in the Instructions array, the process continues to step 160, in which an unexamined opcode is obtained from the Instructions slot 118. In next step 162, the opcode is compared to the hex number 0x00. If the opcode equals that number, then the opcode signifies a "pop" operation, and the actions appropriate for constructing a code fragment are implemented in step 164 (in other embodiments, the hex (or otherwise specified) numbers for opcodes can correspond to other types of instructions and operations). Three actions generally implemented are described above with respect to FIG. 9. Specific actions implemented for the "pop" opcode are summarized in the table shown in Appendix C in the entry for the "pop" opcode (described below). The specific actions and operations which the decompiler specifically takes for each opcode are shown in Appendix H, which is a source code listing for the decompiler of the present invention that will be readily understood by those skilled in the art.

If the examined opcode is not equal to 0x00, then the process continues to step 166, in which the opcode is compared to the hex number 0x01, which represents another opcode, "return." If the opcode is equal to 0x01, then step 165 is implemented, in which the decompiler executes actions and operations to create a code fragment appropriate for the "return" opcode. As referred to above, Appendix C shows a table summarizing the actions taken for some example opcodes to create a code fragment and add the code fragment to the array (described below).

If the examined opcode does not equal 0x0, then the process continues in a similar manner by comparing the examined opcode to the succession of known opcode numbers, some of which are shown in the example table of Appendix C. If the opcode does not equal any of the opcode numbers less than 0xCE, then the examined opcode is compared to the opcode number 0xCF in step 170. If the opcode equals this number, then the opcode is a "new handlers" opcode, and the actions and operations appropriate to generate a code fragment for "new handlers" are accomplished in step 172. If the opcode does not equal 0xCF in step 170, then the process continues to step 174, which implements an error routine that recognizes that the opcode was unrecognized. The process then returns to step 56, in which the Instruction array of opcodes is checked for any unexamined opcodes.

Appendix C shows a table of some example opcodes used in the NewtonScript programming language. The actual opcode (hexadecimal code) is shown in the first column. The name of the opcode is shown in the second column. The actions taken to construct a code fragment when the decompiler identifies a specific opcode in a NewtonScript frame are shown in the third column. These actions include one or more of the three general actions described above with respect to FIG. 9, or may include no actions at all. For example, the "POP" actions of step 164 of FIG. 10, which are implemented when the opcode is recognized as a pop instruction, are shown in the first row of Appendix C. The top element of the stack is popped and is added to the fragment text which was indexed and retrieved from the array of names and the array of literals. The symbol "pop" is then added to the end of the fragment text and popped value to create the code fragment. The code fragment is then added to the code fragment array. The summarized actions for each opcode are described in full detail in the source code listing of the process of the present invention in Appendix H.

Appendix D is a complete listing of a resulting code fragment array for the example shown in Appendices A and B. Each line of the code fragment array is an individual code fragment and includes fragment text, other values, and added symbols.

Figure 11:
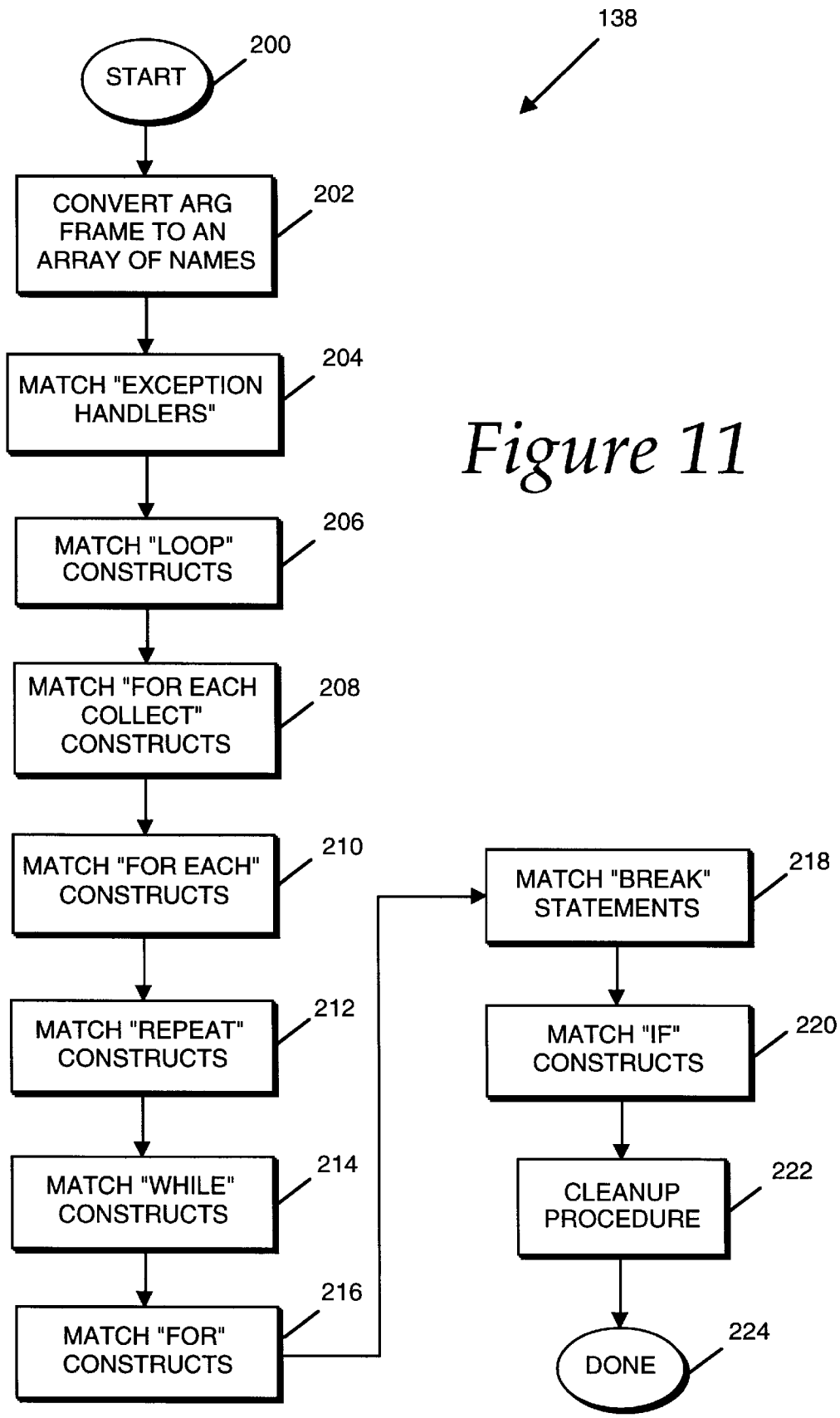
FIG. 11 is a flow diagram illustrating the "Perform Pattern Matching on Code Fragment Array and Produce NewtonScript Code" step of FIG. 8.

FIG. 11 is a flow diagram illustrating step 138 of FIG. 8, in which pattern matching is performed on the completed code fragment array and NewtonScript source code is produced. The process begins at step 200. In step 202, the Argframe 124 of the compiled NewtonScript function is converted to an array of string names. This step is similar to the step 144 of creating an array of names for code fragments, which was described above with respect to FIG. 9. In steps 204–220, several different types of NewtonScript constructs (i.e. programming statements or keyword structures) are matched to the code fragments in the code fragment array by a "pattern matcher", i.e. a portion of the decompiler which finds patterns in the code fragment array. These types of constructs each have a characteristic pattern for which the pattern matcher searches. Each construct is found by checking one or more conditions. The method of matching a code fragment pattern to a construct type is detailed below with reference to FIG. 12. Since many of the constructs have similar conditions, or conditions which may overlap, the order of constructs which are matched can be important so that ambiguity can be avoided. The constructs which are matched by the decompiler have been ordered in the present invention so as to remove that ambiguity.

The more conditions needed to match a code fragment to a type of construct, the more complex the pattern is. In general, the constructs requiring a match with a more complex pattern are searched for earlier in the process than similar constructs requiring simpler pattern matching (less conditions). Thus, for example, the "foreach collect" statement is matched before the "foreach" construct because "foreach collect" requires the decompiler to search for a pattern more complex than is required for the "for each" constructs. Once the "for each collect" constructs have been matched and eliminated from the code fragment array, the "for each" constructs can be searched without matching "foreach collect" constructs by mistake. The same general rule applies to the "if" construct, which is searched for last in the process since the conditions which can indicate an "if" construct are relatively simple; if all the other types of constructs have already been found and eliminated from the code fragment array, then the "if" constructs are all that remain and will not be mistakenly found in place of other constructs.

The pattern matcher of the present invention also includes a function text generator, which performs specific actions for a type of construct to generate function source language text after the construct is matched. The patterns searched for by the pattern matcher and the actions taken by the function generator are detailed in Appendix E for each type of construct.

In step 204, the exception handlers constructs are matched to code fragments in the code fragment array. The exception handlers include statements such as "onexception" which cause the CPU to perform a task in the event of interrupts in the program flow. Each type of NewtonScript construct has a distinguishing pattern that is matched by the decompiler. All constructs of that type in the code fragment array can be matched at one time. The exception handlers have a pattern of checking for "onexception" or a symbol of "callhandlers" and other conditions (as shown in Appendix H). Actions are then performed by the function text generator to convert the matched code fragments to function source code text (actions for exception handlers are detailed in Appendix H). In step 206, "loop" constructs in the compiled code are matched to the "loop" pattern. In the described embodiment, the conditions required to indicate a "loop" construct are if a branch opcode is identified in the code fragment array, and the branch opcode causes the program flow to branch to a memory location above the current location.

If such a pattern is found, then a "loop" construct is indicated, and particular code fragments in the code fragment array are altered to create "loop" construct source code text. Code fragments may be changed, deleted, or added, depending on the type of construct. The actions specific to the "loop" construct are performed to create source code text from the code fragments. These actions are shown in Appendix E are explained in greater detail with respect to FIG. 12. The decompiler identifies all "loop" constructs in the code fragment array in a similar fashion and creates function text for each "loop" construct as it is found.

In step 208, "for each collect" constructs are matched by searching for several patterns in the code fragment array, and function text for the "for each collect" constructs is built by following specific actions. These patterns and actions are listed in Appendix E. In step 210, "for each" constructs are matched by searching for the patterns indicated in Appendix E. Since the "for each collect" constructs have already been found and removed from the code fragment array as function text in step 208, the "for each" constructs can be found without ambiguity (the "for each collect" constructs would also be found in step 210 if they were still present as code fragments in the code fragment array). The source code function text is then built using the actions listed in Appendix E. In step 212, "repeat" constructs are matched by searching for the patterns indicated in Appendix E, and the function text for the "repeat" construct is built. The "for each" constructs must be found and removed from the code fragment array before the "repeat" constructs are matched, since "for each" constructs would be found when using the conditions to find "repeat" constructs if the "for each" constructs were still present as code fragments in the code fragment array.

In step 214, "while" constructs are matched by searching for the patterns indicated in Appendix E, and the function text is built. The "while" construct would also be found if matching the pattern conditions for the "if" construct (described below), so the "while" constructs must be matched before the "if" constructs to avoid ambiguity. In step 216, "for" constructs are matched by searching for the patterns indicated in Appendix E, and the function text is built. In step 218, "break" statements are matched and function text is built using the patterns and actions of Appendix E. Finally, in step 220, "if" constructs are matched and function text built using the patterns and actions of Appendix E. The patterns to match the "if" construct are the simplest (only a "bf" or a "bt" need be found) and are thus matched after all the other constructs have been matched and eliminated from the code fragment array. Other constructs which may be present in other similar types of programming languages can be matched and actions can be taken in a similar manner to that described above.

Preferably, at each step 204 to 220, all the constructs of that type are matched and removed from consideration in the code fragment array. After the pattern matcher finds all the matches in the code fragment array for that construct, then it checks for the patterns of the next construct in the preferred order. The pattern matched automatically checks the code fragment array for every construct. Alternatively, after one construct is completely matched, the pattern matcher can check if any unmatched code fragments remain in the array. If so, the next construct can be matched, and if not, the process can terminate (or continue to step 222) without having to check for all the remaining types of constructs.

It is important to match the constructs generally in the order described above to remove ambiguity from the construct matching procedure. For example, a user would not want the decompiler to match a "foreach" construct where the original source code specified a "foreach collect" construct. Some variation in the order is allowed as long as ambiguities between certain constructs are not allowed. For example, the "foreach collect" construct should always be placed before the "for each" construct. The order of matching constructs can also be important to reduce the computational complexity of the function text generating procedure. Constructs requiring computationally-intensive pattern matching can be matched later than other constructs to avoid trying to match the computationally-intensive constructs if there are none present in the code fragment array.

Once all the types of constructs have been matched and function source code text is built for each type of construct, the process implements step 222, in which "clean up" procedures are undertaken. Such cleanup procedures include adding a header, generating variable declarations, providing proper indentation, and other necessary lines (described in more detail with reference to FIG. 12), and adding an "end" to the entire source code listing. The process of generating the source code lines includes indexing the array of names created in step 202 of FIG. 11 to produce the variable list at the beginning of the function. For example, the lines "local x" and "local slots" of Appendix G are obtained from the array of names. The clean up actions are listed at the end of Appendix E. A complete decompiled source code listing is the result, and the process is complete in step 224.

Figure 12:
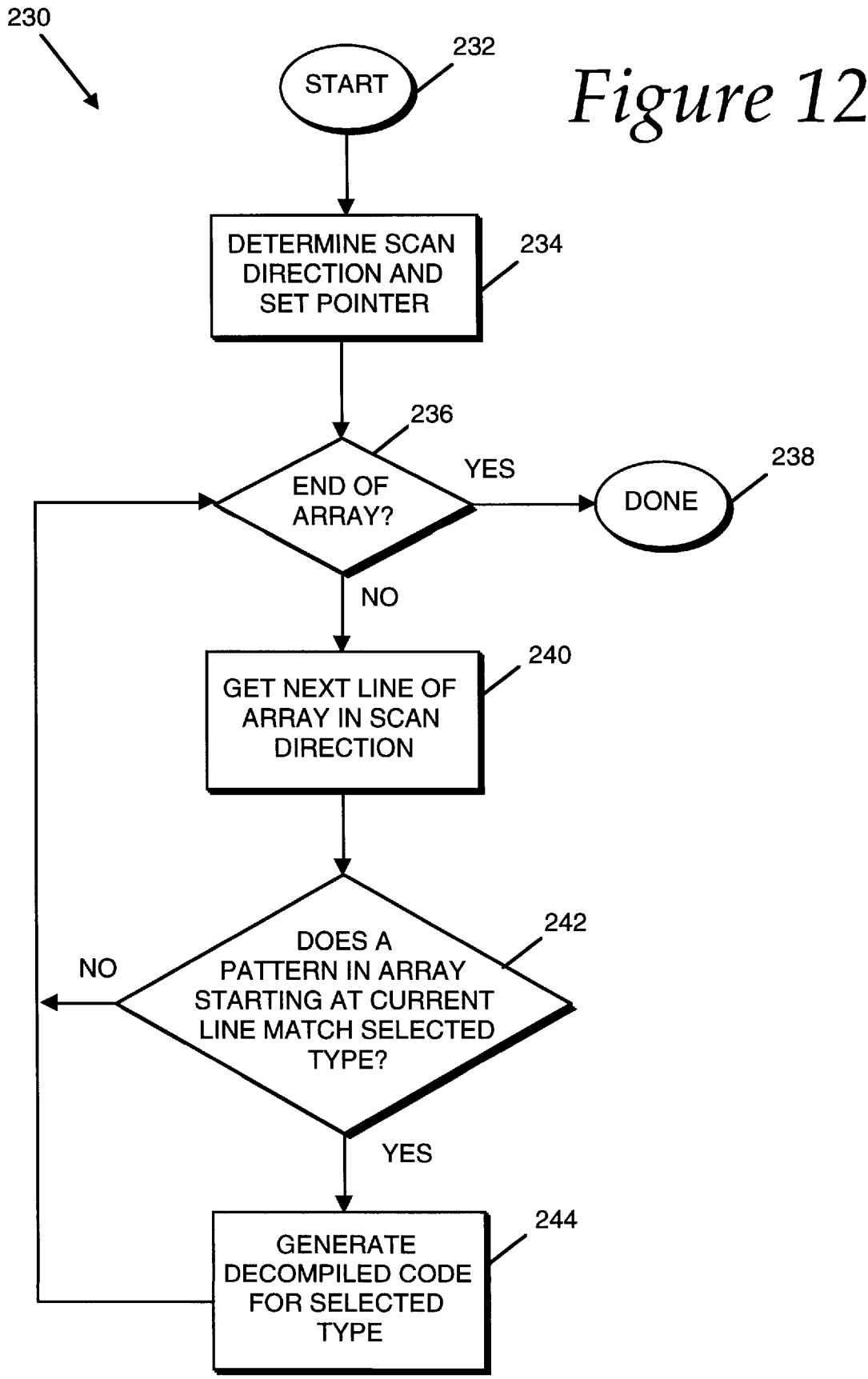
FIG. 12 is a flow diagram illustrating the pattern matching process and source code building implicit in several steps of the process illustrated in FIG. 11.

FIG. 12 is a general flow diagram 230 illustrating steps 204–220 of FIG. 11 in which various types of constructs are matched to patterns in the code fragment array and function text is generated as each type of construct is matched. The process begins at step 232. In step 234, the scan direction is determined and the pointer is set in the code fragment array. The scan direction is the direction in which code fragments are examined in the code fragment array. For some constructs, the lines of the code fragment array are scanned in a forward direction, from the beginning of the array to the end, until a pattern is found. For some different constructs, the scan direction is backward, from the end of the array to the beginning. Different scan directions may be required to find specific code fragments in the code fragment array which correspond to conditions searched for. Depending upon the scan direction, the pointer is set in the code fragment array. The pointer is set to point at an address of a code fragment in the code fragment array. This address is zero when scanning forward, and the last element in the array when scanning backwards.

In step 236, the decompiler checks if the pointer is pointing to the end of the code fragment array, i.e. if the end of the array has been reached. (The "end" of the array can be the actual beginning of the array if the scan direction is from the end of the array to the beginning.) If the end of the array is reached, the process is complete as indicated in step 238. If the end of the array has not been reached, then step 240 is implemented, in which the pointer is incremented to the next code fragment line in the code fragment array in the scan direction. In next step 242, the decompiler checks if a pattern in the array starting at the code fragment which is currently being pointed to by the pointer matches the selected construct type. The conditions shown in Appendix E are checked in the code fragment array at this time to determine if the pattern matches. If the pattern does not match, the process returns to step 236 and checks if the pointer is pointing to the end of the array.

If the pattern does match, then step 244 is implemented, in which the decompiled code for the selected construct type is generated. The actions that are performed on the matched code fragments (lines) of the code fragment array are described in Appendix E and may include setting the text of the line to be in accordance with the format of the selected construct, adding the text of the code fragment (lineText), and deleting specific code fragments. For example, if a "loop" construct is matched, the code fragment textual representation (the second parameter of each code fragment) is retrieved. The text "end" is added, a branch statement is traced to an earlier code fragment, and the text "loop" and "begin" are added to the text of the earlier code fragment. Similarly, if a "repeat" construct is matched, then the text "repeat" and "until" are added to the literal and argument strings to create the source code format of the "repeat" statement. In some cases, several code fragment lines are removed to create source code text. The actions taken for each construct are summarized in Appendix E and are listed in full detail in the source code of Appendix H. Actions in the example of Appendices A and D are described below.

Once the decompiled source code is generated in step 244, the process returns to step 236, in which the decompiler checks if the pointer is at the end of the array. Once the pointer advances to the end of the array, the process is complete. All the constructs shown in FIG. 11 are matched using the same process described above until all the types of constructs available have been searched in the code fragment array and function source code text has been generated for each type.

The code fragment array example generated from the listing of Appendix A and shown in Appendix D can be used to illustrate the constructs found according to the method of the present invention. Note that the line numbers referenced below always refer to the line numbers in the original code fragment array listing shown Appendix D, and not to any renumbered lines after code fragments have been removed or changed. The constructs found and the actions taken as described below are preferably accomplished in the order described.

An exception handler can be found in line 52 of Appendix D. Lines 52–55 are then replaced by the code fragment, [248, "end\nonexception |evt.ex.fr|do\nPrint("Exception encountered")",252,handler]. Also, line 4 is changed to [4, "try\nbegin",0,setvar].

A "loop" construct is found on line 9 of Appendix D. When line 9 is found, the decompiler replaces line 9 with the code fragment [28, "x", 0, pop], adds a code fragment after line 2, the new code fragment being [9, "loop\nbegin", 0, looop], and replaces line 3 with the code fragment [10, "x=0", 20, bf].

A "Foreach collect" construct is found on line 20 of the Appendix D listing. The decompiler then replaces lines 10–22 with the code fragment [34, "slots :=foreach slot, value in self collect slot", 0, setvar].

A "Foreach" construct is found on line 31 of Appendix D. The decompiler replaces the lines 24–27 with the code fragment [123, "foreach slot, value in self do\nbegin\n", 0, setvar]. The decompiler also replaces lines 29–31 with the code fragment [156, "end", 0, feend].

A "repeat" construct is found on line 35 of Appendix D. The decompiler replaces line 33 with [169, "repeat\nPrint (x)", 0, pop] and replaces line 35 with [177,"until x=5", 169, looop].

A "while" construct is found on line 41 of Appendix D. The decompiler replaces lines 37 and 38 with the code fragment [187, "while x>0 do\nbegin\nPrint(x)", 0, pop] and replaces line 41 with the code fragment [200, "end", 190, looop].

A "for" construct is found on line 50 of Appendix D. The decompiler replaces lines 43–47 with the code fragment [210, "for x :=0 to 10 by 2 do\nbegin\n", 0, foor]. The decompiler replaces lines 49–50 with the code fragment, [239, "end", 231, looop].

A "break" construct is found on line 5 of Appendix D. The decompiler replaces line 6 with the code fragment, [16, "break", 33, setvar].

An "if" construct is found on line 3 of Appendix D (the first number of which (9) has already been changed (to 10) by the "loop" construct actions listed above). The decompiler replaces line 3 with [10, "if x=0 then\n\tbegin\n\t"].

The final code fragment array as it appears after the "if" construct actions have been taken and before clean up operations is shown in Appendix F. The decompiler performs cleanup operations on this code fragment array as described above, such as removing all 'incrvar, 'iterdone, 'pushself, and "nil" 'pop lines, adding a header, generating the source code lines from the remaining code fragments, and adding an "end" at the bottom of the source code listing. The final, decompiled source code is shown in Appendix G.

The generated decompiled source code is substantially the same as the original source code used to create the compiled byte codes. The decompiled source code can be compiled and executed again to achieve substantially the same results as the original compiled function.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

APPENDIX A

```
func(arg1, arg2)
begin
  local x := 4;
  local slots;

try
  begin
    loop
    begin
      if x = 0 then
        break;
      print(x);
      x := x - 1
    end;
    slots := foreach slot, value in self collect slot;
    print(slots);
    foreach slot, value in self do
      print(slot);
    repeat
      print(x);
      x := x + 1;
    until x = 5;
    while x > 0 do
    begin
      print(x);
      x := x - 1;
    end;
    for x := 0 to 10 by 2 do
      print(x);
  end
  onexception levt.ex.frl do
    print("Exception encountered");
end;
```

APPENDIX B

```
0000: 27 0010  push-constant 4              005F: 00        pop
0003: A5       set-var [x]                  0060: 7F 0009   get-var [slotvalue|iter]
0004: 18       push evt.ex.fr               0063: 05        iter-done
0005: 27 03F0  push-constant 252            0064: 7F 0009   get-var [slotvalue|iter]
0008: C9       new-handlers 1               0067: 06        pop-handlers
0009: 7D       get-var [x]                  0068: 6F 003F   branch-f 003F
000A: 20       push-constant 0              006B: 5F 0073   branch 0073
000B: C4       freq-func 4 [=/2]            006E: A7 000B   set-var [slotvalue|result]
000C: 6F 0014  branch-f 0014                0071: 00        pop
000F: 22       push-constant nil            0072: 00        pop
0010: 5F 0021  branch 0021                  0073: 7F 000B   get-var [slotvalue|result]
0013: 00       pop                          0076: A6        set-var [slots]
0014: 7D       get-var [x]                  0077: 7E        get-var [slots]
0015: 19       push Print                   0078: 19        push Print
0016: 29       call 1                       0079: 29        call 1
0017: 00       pop                          007A: 00        pop
0018: 7D       get-var [x]                  007B: 03        set-lex-scope
0019: 24       push-constant 1              007C: 22        push-constant nil
001A: C1       freq-func 1 [-/2]            007D: C7 0011   freq-func 17 [newiterator/2]
001B: A5       set-var [x]                  0080: A7 0009   set-var [slotvalue|iter]
001C: 7D       get-var [x]                  0083: 5F 00A0   branch 00A0
001D: 00       pop                          0086: 7F 0009   get-var [slotvalue|iter]
001E: 5F 0009  branch 0009                  0089: 24        push-constant 1
0021: 00       pop                          008A: C2        freq-func 2 [aref/2]
0022: 03       set-lex-scope                008B: A7 0008   set-var [value]
0023: 22       push-constant nil            008E: 7F 0009   get-var [slotvalue|iter]
0024: C7 0011  freq-func 17 [newiterator/2] 0091: 20        push-constant 0
0027: A7 0009  set-var [slotvalue|iter]     0092: C2        freq-func 2 [aref/2]
002A: 7F 0009  get-var [slotvalue|iter]     0093: A7 0007   set-var [slot]
002D: 27 0014  push-constant 5              0096: 7F 0007   get-var [slot]
0030: C2       freq-func 2 [aref/2]         0099: 19        push Print
0031: 1A       push Array                   009A: 29        call 1
0032: 8F FFFF  make-array -1                009B: 00        pop
0035: A7 000B  set-var [slotvalue|result]   009C: 7F 0009   get-var [slotvalue|iter]
0038: 20       push-constant 0              009F: 05        iter-done
0039: A7 000A  set-var [slotvalue|index]    00A0: 7F 0009   get-var [slotvalue|iter]
003C: 5F 0064  branch 0064                  00A3: 06        pop-handlers
003F: 7F 0009  get-var [slotvalue|iter]     00A4: 6F 0086   branch-f 0086
0042: 24       push-constant 1              00A7: 22        push-constant nil
0043: C2       freq-func 2 [aref/2]         00A8: 00        pop
0044: A7 0008  set-var [value]              00A9: 7D        get-var [x]
0047: 7F 0009  get-var [slotvalue|iter]     00AA: 19        push Print
004A: 20       push-constant 0              00AB: 29        call 1
004B: C2       freq-func 2 [aref/2]         00AC: 00        pop
004C: A7 0007  set-var [slot]               00AD: 7D        get-var [x]
004F: 7F 000B  get-var [slotvalue|result]   00AE: 24        push-constant 1
0052: 7F 000A  get-var [slotvalue|index]    00AF: C0        freq-func 0 [+/2]
0055: 7F 0007  get-var [slot]               00B0: A5        set-var [x]
0058: C3       freq-func 3 [setAref/3]      00B1: 7D        get-var [x]
0059: 00       pop                          00B2: 27 0014   push-constant 5
005A: 24       push-constant 1              00B5: C4        freq-func 4 [=/2]
005B: B7 000A  incr-var 10                  00B6: 6F 00A9   branch-f 00A9
005E: 00       pop                          00B9: 22        push-constant nil
```

35

```
00BA: 00      pop                          00DA: 27 0008 push-constant 2
00BB: 5F 00C8 branch 00C8                  00DD: A7 000D set-var [xlincr]
00BE: 7D      get-var [x]                  00E0: 7F 000D get-var [xlincr]
00BF: 19      push Print                   00E3: 7D      get-var [x]
00C0: 29      call 1                       00E4: 5F 00EF branch 00EF
00C1: 00      pop                          00E7: 7D      get-var [x]
00C2: 7D      get-var [x]                  00E8: 19      push Print
00C3: 24      push-constant 1              00E9: 29      call 1
00C4: C1      freq-func 1 [-/2]            00EA: 00      pop
00C5: A5      set-var [x]                  00EB: 7F 000D get-var [xlincr]
00C6: 7D      get-var [x]                  00EE: B5      incr-var 5
00C7: 00      pop                          00EF: 7F 000C get-var [xllimit]
00C8: 7D      get-var [x]                  00F2: BF 00E7 branch-if-loop-done 231
00C9: 20      push-constant 0              00F5: 22      push-constant nil
00CA: C7 000B freq-func 11 [>/2]           00F6: 07 0007 call-handlers
00CD: 67 00BE branch-t 00BE                00F9: 5F 0102 branch 0102
00D0: 22      push-constant nil            00FC: 1B      push "Exception encountered"
00D1: 00      pop                          00FD: 19      push Print
00D2: 20      push-constant 0              00FE: 29      call 1
00D3: A5      set-var [x]                  00FF: 07 0007 call-handlers
00D4: 27 0028 push-constant 10             0102: 02      push-self
00D7: A7 000C set-var [xllimit]
```

APPENDIX C

| OPCODE | NAME | ACTION |
|---|---|---|
| 0x00 | pop | Pop top element from the stack and add it to the end of the fragment text. Add the fragment text to the fragment array with the symbol 'pop. |
| 0x01 | return | Add "return" to end of fragment text. Add fragment text to the fragment array with the symbol 'return. |
| 0x02 | push-self | Add "return" to beginning of the fragment text. Pop top element from stack and add it to the end of the fragment text. Add fragment text to the fragment array with the symbol 'pushself. |
| 0x03 | set-lex-scope | Push "self" onto the stack. |
| 0x04 | iter-next | No action taken. |
| 0x05 | iter-done | Add "IncrStateSlot (", top element of stack, and ")" to the end of the fragment text. Add fragment text to fragment array with the symbol 'iterdone. |
| 0x06 | pop-handlers | Add "CheckIfDone (", top element of stack, and ")" to end of fragment text. Add fragment text to fragment array with the symbol 'pophandlers. |
| 0x07 | call-handlers | Add top element of stack and handler to end of fragment text. Add fragment text to fragment array with the symbol 'pop. |
| 0x08-0x0F | unary2 | Push "unary2" onto the stack. |
| 0x10-0x17 | unary3 | Push "unary3" onto the stack. |
| 0x18-0x1F | push literal | Push literals onto the stack. |
| 0x20-0x27 | push-constant | Push constants onto the stack. |
| 0x58-0x5F | branch | Pop top element from stack and add it to the end of fragment text. Add fragment text to fragment array with the symbol 'bt. |
| 0x60-0x67 | branch-t | Pop top element from stack and add it to the end of fragment text. Add fragment text to fragment array with the symbol 'bt. |
| 0x68-0x6F | branch-f | Pop top element from stack and add it to the end of fragment text. Add fragment text to fragment array with the symbol 'bf. |
| 0x98-0x9F | set-path | Pop top element from stack and add it to the end of fragment text. Add fragment text to fragment array with the symbol 'setpath. |
| 0xA0-0xA7 | set-var | Pop top element from stack and add it, args[c] and ":=" to the end of fragment text. Add fragment text to fragment array with the symbol 'setvar. |
| 0xA8-0xAF | set-find-var literal | Pop top element from stack and add it, lits[c] and ":=" to the end of fragment text. Add fragment text to fragment array with the symbol 'setfindvar. |
| 0xB0-0xB7 | incr-var | Add "IncrVar (", top element from stack, and ")" to the end of fragment text. Add fragment text to fragment array with the symbol 'incrvar. |
| 0xB8-0xBF | branch-if-loop -done | Add elements from stack to the end of fragment text. Add fragment text to fragment array with the symbol 'forloop. |
| 0xC8-0xCF | new-handlers | Add "try" to the end of fragment text. Add text to array with the symbol 'newhandler. |

APPENDIX D

```
1   [[0, "x := 4", 0, setvar],
2    [4, "try", 0, newhandler],
3    [9, "x = 0", 20, bf],
4    [15, "nil", 0, brapop],
5    [16, "", 33, bra],
6    [20, "Print(x)", 0, pop],
7    [24, "x := (x - 1)", 0, setvar],
8    [28, "x", 0, pop],
9    [30, "", 9, bra],
10   [34, "slotvalueliter := NewIterator(self, nil)", 0, setvar],
11   [42, "slotvaluelresult := [Array: slotvalueliter[5]] ", 0, setvar],
12   [56, "slotvaluelindex := 0", 0, setvar],
13   [60, "", 100, bra],
14   [63, "value := slotvalueliter[1]", 0, setvar],
15   [71, "slot := slotvalueliter[0]", 0, setvar],
16   [79, "slotvaluelresult[slotvaluelindex] := slot", 0, pop],
17   [90, "IncrVar(1)", 0, incrVar],
18   [96, "IncrStateSlot(slotvalueliter)", 0, iterdone],
19   [100, "CheckIfDone(slotvalueliter)", 0, pophandlers],
20   [104, "slotvalueliter", 63, bf],
21   [107, "slotvaluelresult := ", 115, bra],
22   [115, "slots := slotvaluelresult", 0, setvar],
23   [119, "Print(slots)", 0, pop],
24   [123, "slotvalueliter := NewIterator(self, nil)", 0, setvar],
25   [131, "", 160, bra],
26   [134, "value := slotvalueliter[1]", 0, setvar],
27   [142, "slot := slotvalueliter[0]", 0, setvar],
28   [150, "Print(slot)", 0, pop],
29   [156, "IncrStateSlot(slotvalueliter)", 0, iterdone],
30   [160, "CheckIfDone(slotvalueliter)", 0, pophandlers],
31   [164, "slotvalueliter", 134, bf],
32   [167, "nil", 0, pop],
33   [169, "Print(x)", 0, pop],
34   [173, "x := (x + 1)", 0, setvar],
35   [177, "x = 5", 169, bf],
36   [185, "nil", 0, pop],
37   [187, "", 200, bra],
38   [190, "Print(x)", 0, pop],
39   [194, "x := (x - 1)", 0, setvar],
40   [198, "x", 0, pop],
41   [200, "x > 0", 190, bt],
42   [208, "nil", 0, pop],
43   [210, "x := 0", 0, setvar],
44   [212, "xllimit := 10", 0, setvar],
45   [218, "xlincr := 2", 0, setvar],
46   [224, "x", 0, brapop],
47   [228, "", 239, bra],
48   [231, "Print(x)", 0, pop],
49   [235, "IncrVar(xlincr)", 0, incrVar],
50   [239, "xlincr:xllimit", 231, forLoop],
51   [245, "nil", 0, pop],
52   [248, "onexception levt.ex.frl do", 252, callhandlers],
53   [249, "", 258, bra],
54   [252, "Print(\"Exception encountered\")", 0, pop],
55   [257, "onexception levt.ex.frl do", 252, callhandlers],
56   [258, "", 0, pushself]]
```

3 8

APPENDIX E

• exception handlers

Conditions: callhandlers (and others-- see Appendix H)

Actions: See Appendix H

• "loop" construct

Conditions: bra above current location

Actions: set text of line to be lineText & "end", change symbol to 'loop, set branch addr
       to 0
       set text of branch line to be "loop\n\tbegin\n\t" & lineText

• "foreach collect" construct

Conditions: bf above current location, previous line symbol is 'pophandlers,
           line + 2 = bra and bra location contains "|result" in the text, line + 1 = bf
           and bf location - 1 is a bra to line Actions:    remove line
           scan backwards until lineText contains NewIterator (curPos)
           s := " in " & first parameter to NewIterator & " collect "
           ArrayRemove(lines, curPos, 3)
           s := first word of line & s
           ArrayRemove(lines, curPos, 1)
           if curPos lineText contains "liter" then s := first word of line & ", " & s; ArrayRemove(lines, curPos, 1)
           s := s & everything after ":=" in line.Text
           while curPos line type <> 'bra ArrayRemove(lines, curPos, 1)
           s := lineText of bra location up to and including ":=" & "foreach " & s;
           delete all lines until at bra location
           lineText := s

• "foreach" construct

Conditions:    bf above current location, previous line symbol is 'pophandlers

Actions: remove line
         set lineText of line to "end", type to 'loop, and set branch to 0

```
            scan backwards until lineText contains NewIterator (curPos)
            s := " in " & first parameter to NewIterator & " do\n\tbegin\n\t"
            ArrayRemove(lines, curPos, 2)
            s := first word of line & s
            ArrayRemove(lines, curPos, 1)
            if curPos lineText contains "liter" then lineText := "foreach " & first word
of line
            & ", " & s
```

- "repeat" construct

Conditions:    bf above current location

Actions:    set text of line to be "until " & lineText, change symbol to 'loop, set
         branch
            addr to 0 set text of branch line to be "repeat\n\t" & lineText

- "while" construct

Conditions:    bt above current location

Actions:    s := "while " & lineText & " do\n\tbegin\n\t"
         lineText := "end", change symbol to 'loop, set branch addr to 0
         set text of branch line to be s & lineText

- "for" construct

Conditions:    forloop

Actions:    set lineText to "end", type to 'loop, and location to 0
            go to line of branch - 1
            loopvar := lineText
            ArrayRemove(lines, curPos, 1)
            curPos := curPos - 1;
            if lineText contains loopvar & "lincr" then
            s := " by " & last word of lineText & " do\n\tbegin\n\t",
         ArrayRemove(lines,
                curPos, 1), curPos--
            else
            s := " do\n\tbegin\n\t"
            s := last word of lineText & s, ArrayRemove(lines, curPos, 1), curPos--
            s := "for " & lineText & " to " & s, ArrayRemove(lines, curPos, 1)
            lineText := s & lineText

- "break" construct

Conditions:    bra instruction with bra line - 1 type = 'loop

Actions:    lineText := "break " & lineText
            bra loc 0, line type 'setver

40

- "if" construct

Conditions: bf or bt

Actions: If line + 1 <> bra then
    s := "if " & lineText & " then\n\tbegin\n\t"
    else
    s := "if " & lineText & if symbol = 'bf then " and " else " or "
    ArrayRemove(lines, curPos, 1)
    while line + 1 = 'bf or 'bt do
    If line + 2 = bra then
    s := s & lineText & if symbol line + 1 = 'bf then " and " else " or "
    ArrayRemove(lines, curPos, 2)
    else
    s := s & lineText & " then\n\tbegin\n\t"
    ArrayRemove(lines, curPos, 1)
    if jumpline - 1 <> bra then
    lineText of jumpLine - 1 := lineText & "\n\tend";
    else
    lineText of jumpline - 1 bra loc - 1 := lineText & "\n\tend"
    lineText of jumpLine - 2 := lineText & "\n\tend";
    lineText of jumpLine := "else\n\tbegin\n\t" & lineText
    ArrayRemove(lines, jumpline - 1, 1)
    ArrayRemove(lines, curPos, 1)
    lineText := s & lineText

- Cleanup

Actions: remove all 'incrvar, 'iterdone, 'pushself, and "nil" 'pop lines
    add in header
    generate lines
    add end

41

APPENDIX F

```
[[0, "x := 4", 0, setvar],
 [4, "try\nbegin", 0, setvar],
 [9, "loop\nbegin", 0, looop],
 [10, "if x = 0 then\n\tbegin\n\t", 0, bf],
 [15, "nil", 0, brapop],
 [16, "break ", 33, setvar],
 [20, "Print(x)", 0, pop],
 [24, "x := (x - 1)", 0, setvar],
 [28, "x", 0, pop],
 [30, "end", 9, looop],
 [34, "slots := foreach slot, value in self collect slot", 0, setvar],
 [119, "Print(slots)", 0, pop],
 [123, "foreach slot, value in self do\nbegin\n", 0, setvar],
 [150, "Print(slot)", 0, pop],
 [156, "end", 0, feend],
 [167, "nil", 0, pop],
 [169, "repeat\nPrint(x)", 0, pop],
 [173, "x := (x + 1)", 0, setvar],
 [177, "until x = 5", 169, looop],
 [185, "nil", 0, pop],
 [187, "while x > 0 do\nbegin\nPrint(x)", 0, pop],
 [194, "x := (x - 1)", 0, setvar],
 [198, "x", 0, pop],
 [200, "end", 190, looop],
 [208, "nil", 0, pop],
 [210, "for x := 0 to 10 by 2 do\nbegin\n", 0, foor],
 [231, "Print(x)", 0, pop],
 [239, "end", 231, looop],
 [245, "nil", 0, pop],
 [248, "end\nonexception levt.ex.frl do\nPrint(\"Exception encountered\")", 252, handler],
 [258, "", 0, pushself]]
```

42

APPENDIX G

```
5       func(arg1, arg2)
        begin
            local   x;
            local   slots;

10          x := 4;
            try
            begin
                loop
                begin
15                  if x = 0 then
                        break ;
                    Print(x);
                    x := (x - 1);
                end;
20              slots := foreach slot, value in self collect slot;
                Print(slots);
                foreach slot, value in self do
                    Print(slot);
                repeat
25                  Print(x);
                    x := (x + 1);
                until x = 5;
                while x > 0 do
                begin
30                  Print(x);
                    x := (x - 1);
                end;
                for x := 0 to 10 by 2 do
                    Print(x);
35          end
            onexception levt.ex.frl do
                Print("Exception encountered");
            end
```

APPENDIX H

(Source Code Listing)

```
constant kfaddr := 0;    // first element in fragment array is the
fragemnts address
constant kfText := 1;    // second element in fragment array is the
fragment text
constant kfBranch := 2;  // third element in fragment array is the branch
address
constant kfSymbol := 3;  // final element in fragment array is the symbol
for identifying the fragment
DefConst('kHexChars, "0123456789ABCDEF");

JokeView :=
{
    GetFirstWord: func(s) begin
                local spLoc := StrPos(s, " ", 0);
                if spLoc then
                    SubStr(s, 0, spLoc);
                else
                    s;
        end, GetLastWord: func(s) begin
                local i := StrPos(s, ":= ", 0);
                if i then
                    return SubStr(s, i + 3, StrLen(s) - i - 3);
                local words := StrParse(s, " ");
                words[Length(words) - 1];
        end, MakeHexByte: func(n)
            kHexChars[band(n >> 4, 0x0f)] & kHexChars[band(n, 0x0f)], MakeHexWord: func(n)
            kHexChars[band(n >> 12, 0x0f)] & kHexChars[band(n >> 8,
0x0f)] & kHexChars[band(n >> 4, 0x0f)] & kHexChars[band(n, 0x0f)], MakeHexLong: func(n) begin
                local s := kHexChars[band(n >> 28, 0x0f)] &
                kHexChars[band(n >> 24, 0x0f)] &
                kHexChars[band(n >> 20, 0x0f)] &
                kHexChars[band(n >> 16, 0x0f)] &
                kHexChars[band(n >> 12, 0x0f)] &
                kHexChars[band(n >> 8, 0x0f)] &
                kHexChars[band(n >> 4, 0x0f)] &
                kHexChars[band(n, 0x0f)];

while s[0] = $0 do
                    s := SubStr(s, 1, StrLen(s) - 1);
        end, PrintArray: func(f) begin
                local s := "[";
                local curDepth := vars.curDepth;
                local ref := refof(f);

if ref mod 4 = 3 and ref div 4 < 500 and curDepth > 0
then
```

```
                        return PrintMagicPtr(ref);

if ClassOf(f) <> 'Array then
                  s := s & ClassOf(f) & ": ";

if curDepth = nil then begin
                  SetGlobal(0, 'curDepth);
                  curDepth := 0;
            end
            else if curDepth = printdepth + 1 then
                  return s & $# & MakeHexLong(ref) & $];
            else
                  SetGlobal(curDepth + 1, 'curDepth);

foreach val in f do begin
                  if PrimClassOf(val) = 'Frame then begin
                        if ClassOf(val) = 'CodeBlock then
                              s := s & DumpCode(val);
                        else
                              s := s & PrintFrame(val);
                  end;
                  else if PrimClassOf(val) = 'Array then
                        s := s & PrintArray(val);
                  else
                        s := s & SPrintObject(val);
                  s := s & ", ";
            end;
            if StrLen(s) > 3 then
                  s[StrLen(s) - 2] := $];
            else
                  s := s & $];

SetGlobal(curDepth, 'curDepth);
            TrimString(s);
      end,

PrintViewClass:
   func(val)
   begin
      local s := "";

if not val then
            return "NIL";

if clObject = val then
         s := "clObject";
      else if clResponder = val then
         s := "clResponder";
      else if clModel = val then
         s := "clModel";
      else if clApplication = val then
         s := "clApplication";
      else if clNotebook = val then
         s := "clNotebook";
      else if clMacNotebook = val then
         s := "clMacNotebook";
      else if clARMNotebook = val then
         s := "clARMNotebook";
      else if clWindowsNotebook = val then
         s := "clWindowsNotebook";
      else if clView = val then
         s := "clView";
      else if clRootView = val then
```

```
            s := "clRootView";
        else if clPictureView = val then
            s := "clPictureView";
        else if clIconView = val then
            s := "clIconView";
        else if clEditView = val then
            s := "clEditView";
        else if clContainerView = val then
            s := "clContainerView";
        else if clKeyboardView = val then
            s := "clKeyboardView";
        else if clMonthView = val then
            s := "clMonthView";
        else if clParagraphView = val then
            s := "clParagraphView";
        else if clPolygonView = val then
            s := "clPolygonView";
        else if clDataView = val then
            s := "clDataView";
        else if clMathExpView = val then
            s := "clMathExpView";
        else if clMathOpView = val then
            s := "clMathOpView";
        else if clMathLineView = val then
            s := "clMathLineView";
        else if clScheduleView = val then
            s := "clScheduleView";
        else if clRemoteView = val then
            s := "clRemoteView";
        else if clTrainView = val then
            s := "clTrainView";
        else if clDayView = val then
            s := "clDayView";
        else if clPickView = val then
            s := "clPickView";
        else if clGaugeView = val then
            s := "clGaugeView";
        else if clRepeatingView = val then
            s := "clRepeatingView";
        else if clPrintView = val then
            s := "clPrintView";
        else if clMeetingView = val then
            s := "clMeetingView";
        else if clSliderView = val then
            s := "clSliderView";
        else if clCharBoxView = val then
            s := "clCharBoxView";
        else if clTextView = val then
            s := "clTextView";
        else if clLibrarian = val then
            s := "clLibrarian";
        else if clOutline = val then
            s := "clOutline";
        else if clPage = val then
            s := "clPage";
        else if clCopperfield = val then
            s := "clCopperfield";
        else
            s := s & val;

return s;
    end;,
MatchOnException:
```

```
        func native(frags)
        begin
            // Take care of the wonderfully funky try on exception
handlers first
            local curFrag := 0;
            local SymbolTest := func(val, item) item[kfSymbol] = val;

while curFrag < Length(frags) - 1 do
            begin
                if frags[curFrag][kfSymbol] = 'callhandlers then
                begin
        if vars.debug = 'dumpcallhandlers or vars.debug = 'dumpall then
        begin
        if vars.debug = 'dumpall then print("Exception handler");
        print(frags);
        print(curFrag);
        end;
                    // remove the bra line
                    ArrayRemoveCount(frags, curFrag + 1, 1);
                    // find the end of the execption code
                    nextFrag := ArrayPos(frags, 'callhandlers, curFrag + 1,
SymbolTest);

if curFrag + 2 = nextFrag then // no need for begin end
                    begin
                        frags[curFrag][kfText] := frags[curFrag][kfText] &
"\n\t\t" & frags[curFrag + 1][kfText];
                        frags[curFrag][kfSymbol] := 'handler;
                        ArrayRemoveCount(frags, curFrag + 1, 2);
                    end
                    else
                    begin
                            frags[curFrag][kfText] :=
frags[curFrag][kfText] & "\n\tbegin\n\t" & frags[curFrag + 1][kfText];
                            frags[curFrag][kfSymbol] := 'handler;
                            frags[nextFrag][kfText] := "end";
                            frags[nextFrag][kfSymbol] := 'handler;
                            ArrayRemoveCount(frags, curFrag + 1, 1);
                    end;
                    // now and the begin end for the contents of the try
                    nextFrag  := curFrag - 1;
                    while not StrPos(frags[nextFrag][kfText], "try", 0) do
                        nextFrag := nextFrag - 1;
                    if nextFrag + 2 = curFrag then
                    begin
                        frags[nextFrag][kfSymbol] := 'setvar;
                        curFrag := nextFrag + 1;
                    end
                    else
                    begin
                        frags[nextFrag][kfText] := frags[nextFrag][kfText] &
"\n\tbegin";
                        frags[nextFrag][kfSymbol] := 'setvar;
                        frags[curFrag][kfText] := "end\n\t" &
frags[curFrag][kfText];
                        curFrag := curFrag - 1;
                    end;
                end;
                curFrag := curFrag + 1;
            end;
        end;
        ,
    PrintViewFont:
```

```
    func(vf)
    begin
        local   v;
        local   s := "";

if not vf then
                return "NIL";

v := band(vf, tsFamilyMask);
        if v = 1 then
            s := " + tsFancy";
        else if v = 2 then
            s := " + tsSimple";
        else if v <> 0 then
            s := " + " & v;

v := band(vf, tsSizeMask);
        s := s & " + tsSize(" & (v >> tsSizeShift) & ")";

v := band(vf, tsFaceMask);
        if v = 0 then
            s := s & " + tsPlain";
        else
        begin
           if band(vf, tsBold) <> 0 then
               s := s & " + tsBold";
           if band(vf, tsItalic) <> 0 then
               s := s & " + tsItalic";
           if band(vf, tsUnderline) <> 0 then
               s := s & " + tsUnderline";
           if band(vf, tsOutline) <> 0 then
               s := s & " + tsOutline";
           if band(vf, tsSuperScript) <> 0 then
               s := s & " + tsSuperScript";
           if band(vf, tsSubScript) <> 0 then
               s := s & " + tsSubScript";
           if band(vf, tsUndefinedFace) <> 0 then
               s := s & " + tsUndefinedFace";
        end;

return SubStr(s, 3, StrLen(s) - 3);
    end,
viewBounds: {left: 0, top: 112, right: 160, bottom: 216},
GetIterator:
  func(s)
  begin
      local i, j;

i := StrPos(s, "NewIterator(", 0);
      if i then
      begin
            i := i + 12;
            j := StrLen(s) - 1;
            if j then
            begin
                  while s[j] <> $, and j > i + 1 do
                        j := j - 1;
                  return SubStr(s, i, j - i);
            end;
      end;
      return "";
  end,
_proto: @180,
```

```
    MakeLineArray:
      func(rtn)
      begin
         local i, j, k, n, m, b, c;
         local t := "";
         local cf := rtn;
         local args := [args:];
         local lits := [literals:];
         local stack := [];
         local handlers := [];
         local theClass;
         local lines := [];
         local lineText := "";
         local lineStart := 0;
         local oldLength := 0;

// Convert the argFrame to a list of slot names
         foreach slot, val in cf.argFrame do
             AddArraySlot(args, SPrintObject(slot));

if cf.literals then
             foreach val in cf.literals do
             begin
                 theClass := ClassOf(val);
                 if theClass = 'pathExpr then
                     AddArraySlot(lits, $' & PrintPathExpr(val));
                 else if theClass = 'CodeBlock then
                     AddArraySlot(lits, DumpCode(val) & $;);
                 else if theClass = 'String then
                 begin
                     i := StrPos(val, "\n", 0);
                     while i do
                     begin
                             val := SubStr(val, 0, i) & "\\n" & SubStr(val, i
+ 1, StrLen(val) - i - 1);
                             i := StrPos(val, "\n", i + 2);
                     end;
                     i := StrPos(val, "\t", 0);
                     while i do
                     begin
                             val := SubStr(val, 0, i) & "\\t" & SubStr(val, i
+ 1, StrLen(val) - i - 1);
                             i := StrPos(val, "\t", i + 2);
                     end;
                     i := StrPos(val, "\"", 0);
                     while i do
                     begin
                             val := SubStr(val, 0, i) & "\\\"" & SubStr(val,
i + 1, StrLen(val) - i - 1);
                             i := StrPos(val, "\"", i + 2);
                     end;
                     AddArraySlot(lits, "\"" & val & "\"");
                 end
                 else if theClass = 'Char then
                 begin
                             if val < Chr(33) or val > Chr(126) then
                                     t := "$\\u" & MakeHexWord(Ord(val));
                             else
                                     t := "$" & val;
                     AddArraySlot(lits, t);
                 end
                 else
                 begin
```

49

```
                    t := SPrintObject(val);
//              if t[0] = ${ then
//                  t := $' & t;
//              else
                    t := MakeValidSymbol(t);
                AddArraySlot(lits, t);
            end;
        end;

t := "";
    try
    for i := 0 to length(cf.instructions) - 1 do
    begin
        b := ExtractByte(cf.instructions, i);
        c := band(b, 7);
        if c = 7 then
        begin
            c := ExtractWord(cf.instructions, i + 1);
            i := i + 2;
        end;
        k := Length(stack) - 1;

// 00              pop
        if b = 0x00 then
        begin
            if k >= 0 then
            begin
                lineText := lineText & stack[k];
                SetLength(stack, k);
            end;
            if StrLen(lineText) > 0 then
                            AddArraySlot(lines, [lineStart, lineText,
0, 'pop]);
            lineText := "";
            lineStart := i + 1;
        end;
// 01              return
        else if b = 0x01 then
        begin
            lineText := lineText & "return";
            AddArraySlot(lines, [lineStart, lineText, 0, 'rtn]);
            lineText := "";
            lineStart := i + 1;
        end;
// 02              push-self
        else if b = 0x02 then
        begin
            if k >= 0 then
            begin
                if i < length(cf.instructions) - 1 then
                    lineText := "return " & lineText & stack[k];
                else
                    lineText := lineText & stack[k];
                AddArraySlot(lines, [lineStart, lineText, 0,
'pushself]);
                lineText := "";
                //AddArraySlot(lines, [i, lineText, 0, 'pushself]);
                SetLength(stack, k);
                lineStart := i + 1;
            end;
            else if i = length(cf.instructions) - 1 then
                AddArraySlot(lines, [lineStart, "", 0, 'pushself]);
        end;
```

```
//  03              set-lex-scope
        else if b = 0x03 then
            AddArraySlot(stack, "self");
//  04              iter-next
        else if b = 0x04 then
        begin
            //k := Length(stack) - 1;
            //t := DumpCode(stack[k]);
            //stack[k] := t;
        end;
//  05              iter-done
        else if b = 0x05 then
        begin
            k := Length(stack) - 1;
            lineText := lineText & "IncrStateSlot(" & stack[k] &
")";
            AddArraySlot(lines, [lineStart, lineText, 0,
'iterdone]);
            lineText := "";
            lineStart := i + 1;
        end;
//  06              pop-handlers
        else if b = 0x06 then
        begin
            k := Length(stack) - 1;
            lineText := lineText & "CheckIfDone(" & stack[k] & ")";
            AddArraySlot(lines, [lineStart, lineText, 0,
'pophandlers]);
            lineText := "";
            lineStart := i + 1;
            SetLength(stack, k);
        end;
//  07              call-handlers???
        else if b = 0x07 then
        begin
            if k > -1 then
            begin
                lineText := lineText & stack[k];
                AddArraySlot(lines, [lineStart, lineText, 0, 'pop]);
                SetLength(stack, k);
                lineText := "";
                lineStart := i;
            end;
            lineText := lineText & handlers[Length(handlers) -
1][0];
            AddArraySlot(lines, [lineStart, lineText,
handlers[Length(handlers) - 1][1], 'callhandlers]);
            lineText := "";
            lineStart := i + 1;
            //SetLength(handlers, Length(handlers) - 1);
        end;
//  08-0F           unary2
        else if b >= 0x08 and b <= 0x0F then
            AddArraySlot(stack, "unary2 " & c);
//  10-17           unary3
        else if b >= 0x10 and b <= 0x17 then
            AddArraySlot(stack, "unary3 " & c);
//  18-1F           push literal
        else if b >= 0x18 and b <= 0x1F then
        begin
            if cf.literals and PrimClassOf(cf.literals[c]) = 'Array
and ClassOf(cf.literals[c]) <> 'PathExpr then
                AddArraySlot(stack, cf.literals[c]);
```

51

```
                else if cf.literals and (ClassOf(cf.literals[c]) =
'Symbol or (PrimClassOf(cf.literals[c]) = 'Frame and
ClassOf(cf.literals[c]) <> 'CodeBlock)) then
                    AddArraySlot(stack, $' & lits[c]);
                else
                    AddArraySlot(stack, lits[c]);
            end;
    // 20-27        push-constant
            else if b >= 0x20 and b <= 0x27 then
            begin
                if c mod 4 = 0 then // literal number
                    AddArraySlot(stack, c div 4);
                else if c mod 4 = 1 then  // memory address
                    AddArraySlot(stack, $# & MakeHexLong(c));
                else if c mod 4 = 2 then
                begin
                    c := c div 16;
                    if c = 0 then
                        t := "nil";
                    else if c = 1 then
                        t := "true";
                    else if c = 9 then
                        t := "$\\t";
                    else if c = 13 then
                        t := "$\\n";
                    else if c = 92 then
                        t := "$\\\\";
                    else if c < 33 or c > 126 then
                        t := "$\\u" & MakeHexWord(c);
                    else
                        t := "$" & CHR(c);
                    AddArraySlot(stack, t);
                end;
                else if c mod 4 = 3 then
                    AddArraySlot(stack, PrintMagicPtr(c));
            end;
    // 28-2F        call
            else if b >= 0x28 and b <= 0x2F then
            begin
                t := SubStr(stack[k], 1, StrLen(stack[k]) - 1) & $(;
                if c > 1 then
                    for j := k - c to k - 1 do
                        t := t & stack[j] & if j < k - 1 then ", ";
                if c = 1 then
                    t := t & stack[k - 1];
                t := t & ")";
                SetLength(stack, k - c);
                AddArraySlot(stack, t);
            end;
    // 30-37        invoke
            else if b >= 0x30 and b <= 0x37 then
            begin
                t := "call " & if stack[k][0] = $' then SubStr(stack[k],
1, StrLen(stack[k]) - 1) else stack[k] & " with (";
                if c > 1 then
                    for j := k - c to k - 1 do
                        t := t & stack[j] & if j < k - 1 then ", ";
                if c = 1 then
                    t := t & stack[k - 1];
                t := t & ")";
                SetLength(stack, k - c);
                AddArraySlot(stack, t);
            end;
```

52

```
//  38-3F          send
//  40-47     send-if-defined
        else if b >= 0x38 and b <= 0x47 then
        begin
            k := length(stack) - 2;
            if b < 0x40 then
                t := ":";
            else
                t := ":?";
            t := stack[k] & t & SubStr(stack[k + 1], 1,
StrLen(stack[k + 1]) - 1) & "(";
            if c > 1 then
                for j := k - c to k - 2 do
                    t := t & stack[j] & ", ";
            if c >= 1 then
                t := t & stack[k - 1];
            t := t & ")";
            SetLength(stack, k - c);
            AddArraySlot(stack, t);
        end;
//  48-4F          resend
//  50-57     resend-if-defined
        else if b >= 0x48 and b <= 0x57 then
        begin
            k := length(stack) - 1;
            if b < 0x50 then
                t := "inherited:";
            else
                t := "inherited:?";
            t := t & SubStr(stack[k], 1, StrLen(stack[k]) - 1) &
"(";
            if c > 1 then
                for j := k - c to k - 1 do
                    t := t & stack[j] & ", ";
            if c = 1 then
                t := t & stack[k - 1];
            t := t & ")";
            SetLength(stack, k - c);
            AddArraySlot(stack, t);
        end;
//  58-5F          branch
        else if b >= 0x58 and b <= 0x5F then
        begin
            if k >= 0 then
            begin
                lineText := lineText & stack[k];
                SetLength(stack, k);
                AddArraySlot(lines, [lineStart, lineText, 0,
'brapop]);
                lineText := "";
                lineStart := i - if b = 0x5F then 2 else 0;
                end;
            AddArraySlot(lines, [lineStart, lineText, c, 'bra]);
            lineText := "";
            lineStart := i + 1;
        end;
//  60-67          branch-t
        else if b >= 0x60 and b <= 0x67 then
        begin
            lineText := lineText & stack[k];
            AddArraySlot(lines, [lineStart, lineText, c, 'bt]);
            lineText := "";
            lineStart := i + 1;
```

```
                    SetLength(stack, k);
                end;
        // 68-6F      branch-f
            else if b >= 0x68 and b <= 0x6F then
                begin
                    lineText := lineText & stack[k];
                    AddArraySlot(lines, [lineStart, lineText, c, 'bf']);
                    lineText := "";
                    lineStart := i + 1;
                    SetLength(stack, k);
                end;
        // 70-77 find-var literal
            else if b >= 0x70 and b <= 0x77 then
                AddArraySlot(stack, lits[c]);
        // 78-7F   get-var
            else if b >= 0x78 and b <= 0x7F then
                AddArraySlot(stack, args[c]);
        // 80-87 make-frame
            else if b >= 0x80 and b <= 0x87 then
                begin
                    t := "{";
                    if c > 0 then
                        for j := 0 to c - 1 do
                            t := t & stack[k][j + 1] & ": " & stack[k - c + j]
& ", ";
                    t := SubStr(t, 0, StrLen(t) - 2) & $};
                    SetLength(stack, k - c);
                    AddArraySlot(stack, t);
                end
        // 88-8F       make-array
            else if b >= 0x88 and b <= 0x8F then
                begin
                    t := "[" & SubStr(stack[k], 1, StrLen(stack[k]) - 1) &
": ";
                    if c < 0 then
                        c := k;
                    if (c > 0) then
                        for j := k - c to k - 1 do
                            t := t & stack[j] & ", ";
                    if c = 0 then
                        t[StrLen(t) - 1] := $];
                    else
                        t[StrLen(t) - 2] := $];
                    SetLength(stack, k - c);
                    AddArraySlot(stack, t);
                end;
        // 90-97    get-path
            else if b >= 0x90 and b <= 0x97 then
                begin
                    if c = 0 then
                    begin
                        t := stack[k := k - 1] & ".";
                        if stack[k + 1][0] = $' then
                            t := t & SubStr(stack[k + 1], 1, StrLen(stack[k
 + 1]) - 1);
                        else
                            t := t & $( & stack[k + 1] & ")";
                    end
                    else
                    begin
                        t := stack[k - c] & ".";
                        if (c > 0) then
                            for j := k - c + 1 to k do
```

54

```
                    begin
                        if stack[j][0] = $' then
                            t := t & SubStr(stack[j], 1,
StrLen(stack[j]) - 1) & ".";
                        else
                            t := t & $( & stack[j] & ").";
                        end;
                            t := SubStr(t, 0, StrLen(t) - 1);
                end;
                SetLength(stack, k - c);
                AddArraySlot(stack, t);
            end;
    // 98-9F   set-path
            else if b >= 0x98 and b <= 0x9F then
            begin
                if c = 0 then
                    c := 2;
                else
                    c := c + 1;
                t := stack[k - c] & ".";
                if (c >= 1) then
                    for j := k - c + 1 to k - 1 do
                        t := t & "(" & stack[j] & ").";
                t := SubStr(t, 0, StrLen(t) - 1) & " := " & stack[k];
                SetLength(stack, k - c);
                AddArraySlot(stack, t);
                lineText := lineText & stack[Length(stack) - 1];
                        AddArraySlot(lines, [lineStart, lineText, 0,
'setpath]);
                lineText := "";
                lineStart := i + 1;
                SetLength(stack, Length(stack) - 1);
            end;
    // A0-A7   set-var
            else if b >= 0xA0 and b <= 0xA7 then
            begin
                if k > -1 then
                begin
                    lineText := lineText & args[c] & " := " & stack[k];
                    AddArraySlot(lines, [lineStart, lineText, 0,
'setvar]);
                    lineText := "";
                    lineStart := i + 1;
                    SetLength(stack, k);
                end;
                else
                begin
                            lines[Length(lines) - 1][1] := args[c] & "
 := " & lines[Length(lines) - 1][1];
                    end
            end;
    // A8-AF   set-find-var literal
            else if b >= 0xA8 and b <= 0xAF then
            begin
                lineText := lineText & lits[c] & " := " & stack[k];
                AddArraySlot(lines, [lineStart, lineText, 0,
'setfindvar]);
                lineText := "";
                lineStart := i + 1;
                SetLength(stack, k);
            end;
    // B0-B7   incr-var
            else if b >= 0xB0 and b <= 0xB7 then
```

55

```
            begin
                lineText := lineText & "IncrVar(" & stack[k] & ")";
                AddArraySlot(lines, [lineStart, lineText, 0, 'incrvar]);
                lineText := "";
                lineStart := i + 1;
                SetLength(stack, k);
            end;
        // B8-BF    branch-if-loop-done
            else if b >= 0xB8 and b <= 0xBF then
            begin
                t := stack[k];
                if k > 1 then
                begin
                    t := stack[k := k - 1] & ":" & stack[k := k - 1] &
":" & t;
                end
                else if k > 0 then
                    t := stack[k := k - 1] & ":" & t;
                lineText := lineText & t;
                AddArraySlot(lines, [lineStart, lineText, c, 'forloop]);
                lineText := "";
                lineStart := i + 1;
                SetLength(stack, k);
            end;
        // C0-C7    freq-func
            else if b >= 0xC0 and b <= 0xC7 then
            begin
                t := stack[k];
                if c = 0x00 then
                    t := $( & stack[k := k - 1] & " + " & t & $);
                else if c = 0x01 then
                    t := $( & stack[k := k - 1] & " - " & t & $);
                else if c = 0x02 then
                    t := stack[k := k - 1] & "[" & t & "]";
                else if c = 0x03 then
                begin
                    t := "[" & stack[k := k - 1] & "] := " & t;
                    t := stack[k := k - 1] & t;
                end;
                else if c = 0x04 then
                    t := stack[k := k - 1] & " = " & t;
                else if c = 0x05 then
                    t := "not " & t;
                else if c = 0x06 then
                    t := stack[k := k - 1] & " <> " & t;
                else if c = 0x07 then
                    t := $( & stack[k := k - 1] & " * " & t & $);
                else if c = 0x08 then
                    t := $( & stack[k := k - 1] & " / " & t & $);
                else if c = 0x09 then
                    t := $( & stack[k := k - 1] & " div " & t & $);
                else if c = 0x0A then
                    t := stack[k := k - 1] & " < " & t;
                else if c = 0x0B then
                    t := stack[k := k - 1] & " > " & t;
                else if c = 0x0C then
                    t := stack[k := k - 1] & " >= " & t;
                else if c = 0x0D then
                    t := stack[k := k - 1] & " <= " & t;
                else if c = 0x0E then
                    t := "band(" & stack[k := k - 1] & ", " & t & ")";
                else if c = 0x0F then
                    t := "bor(" & stack[k := k - 1] & ", " & t & ")";
```

```
                    else if c = 0x10 then
                        t := "bnot(" & stack[k := k - 1] & ", " & t & ")";
                    else if c = 0x11 then
                        t := "NewIterator(" & stack[k := k - 1] & ", " & t &
")";
                    else if c = 0x12 then
                        t := "Length(" & t & ")";
                    else if c = 0x13 then
                        t := "Clone(" & t & ")";
                    else if c = 0x14 then
                        t := "SetClass(" & stack[k := k - 1] & ", " & t &
")";
                    else if c = 0x15 then
                        t := "AddArraySlot(" & stack[k := k - 1] & ", " & t &
")";
                    else if c = 0x16 then
                        t := "stringer(" & t & ")";
                    else if c = 0x17 then
                    begin
                        if t[0] = $' then
                                    t := SubStr(t, 1, StrLen(t) - 1);
                        else
                            t := $( & t & $);
                         t := stack[k := k - 1] & "." & t & " exists";
                    end;
                    else if c = 0x18 then
                        t := "ClassOf(" & t & ")";
                    else
                    begin
                        Print("Unknown instructions: C7 " & MakeHexWord(c) &
" at location " & MakeHexWord(i));
                        Print(stack);
                    end;

SetLength(stack, k);
                    AddArraySlot(stack, t);
                end;
        // C8-CF   new-handlers
                else if b >= 0xC8 and b <= 0xCF then
                begin
                    lineText := lineText & "try";
                    AddArraySlot(lines, [lineStart, lineText, 0,
'newhandler]);
                    lineText := "";
                    lineStart := i + 1;
                    if c = 0 then
                        AddArraySlot(handlers, ["onexception do", 0]);
                    else
                    begin
                        t := stack[k := k - 1];
                        AddArraySlot(handlers, ["onexception " & SubStr(t, 1,
StrLen(t) - 1) & " do", stack[k + 1]]);
                        SetLength(stack, k);
                    end;
                end;
            end;
            else
            begin
                if band(b, 0x07) = 7 then
                begin
                    t := "Unknown instructions: " & MakeHexByte(b);
                    b := ExtractWord(cf.instructions, i + 1);
                    i := i + 2;
                    t := t && MakeHexWord(b);
```

57

```
                end;
            else
                t := "Uknown opcode: " & MakeHexByte(b);
                print(t & " at location " & MakeHexWord(i));
                print(stack);
            end;
        end;
        onexception |evt.ex.fr| do
        begin
            print("Exception at offset " & MakeHexWord(i) & "
instruction " & MakeHexByte(b));
            print(stack);
        end;

return lines;
    end,
printviewformat:
    func(vf)
    begin
        local v;
        local s := "";

if not vf then
                return "NIL";

v := band(vf, vfFillMask);
        if v = vfNone then
            s := "vfNone";
        else if v = vfFillWhite then
            s := "vfFillWhite";
        else if v = vfFillLtGray then
            s := "vfFillLtGray";
        else if v = vfFillGray then
            s := "vfFillGray";
        else if v = vfFillDkGray then
            s := "vfFillDkGray";
        else if v = vfFillBlack then
            s := "vfFillBlack";
        else if v = vfFillCustom then
            s := "vfFillCustom";
        else if v = vfMatte then
            s := "vfMatte";
        else
            s := " " & v;

v := band(vf, vfFrameMask);
        if v = vfFrameWhite then
            s := s & " + vfFrameWhite";
        else if v = vfFrameLtGray then
            s := s & " + vfFrameLtGray";
        else if v = vfFrameGray then
            s := s & " + vfFrameGray";
        else if v = vfFrameDkGray then
            s := s & " + vfFrameDkGray";
        else if v = vfFrameBlack then
            s := s & " + vfFrameBlack";
        else if v = vfFrameCustom then
            s := s & " + vfFrameCustom";
        else if v = vfFrameMatte then
            s := s & " + vfFrameMatte";

v := band(vf, vfLinesMask);
        if v = vfLinesWhite then
```

```
                s := s & " + vfLinesWhite";
            else if v = vfLinesLtGray then
                s := s & " + vfLinesLtGray";
            else if v = vfLinesGray then
                s := s & " + vfLinesGray";
            else if v = vfLinesDkGray then
                s := s & " + vfLinesDkGray";
            else if v = vfLinesBlack then
                s := s & " + vfLinesBlack";

v := band(vf, vfPenMask) >> vfPenShift;
            if v <> 0 then
                s := s & " + vfPen(" & v & ")";

v := band(vf, vfInsetMask) >> vfInsetShift;
            if v <> 0 then
                s := s & " + vfInset(" & v & ")";

v := band(vf, vfShadowMask) >> vfShadowShift;
            if v <> 0 then
                s := s & " + vfShadow(" & v & ")";

v := band(vf, vfHiliteMask);
            if v = vfHiliteInvert then
                s := s & " + vfHiliteInvert";
            else if v = vfHiliteBullet then
                s := s & " + vfHiliteBullet";
            else if v = vfHiliteTriangle then
                s := s & " + vfHiliteTriangle";

v := band(vf, vfRoundMask) >> vfRoundShift;
            if v <> 0 then
                s := s & " + vfRound(" & v & ")";
            return s;
        end,
    DumpCode:
        func(f)
        begin
            local frags := MakeLineArray(f);
            local args := [];
            local curFrag, nextFrag, i, j, k;
            local brAddr;
            local s;
            local startAddr;
            local exitAddr := Length(f.instructions) - 1;
            local loopvar;

if vars.noCode then
                return $< & "Codeblock, " & f.NumArgs & " args #" &
MakeHexLong(refof(f)) & $>;

local AddrTest := func(val, item) item[kfaddr] = val;
            local WordTest := func(val, item) StrEqual(item[0], val);

//    if dumpRaw then
        //    begin
        //        vars.printdepth := 1;
        //        write(sprintobject(f.literals) & $\n);
        //        write(sprintobject(args) & $\n);
        //        vars.printdepth := oldDepth;
        //        write(Disasm(f));
        //    end;
```

59

```
            // Convert the argFrame to a list of slot names
            foreach slot, val in f.argFrame do
                AddArraySlot(args, [SPrintObject(slot), nil]);

MatchOnException(frags);
            MatchLoop(frags);

// handle foreach collect
            curFrag := 0;
            while curFrag < Length(frags) - 1 do
            begin
                if frags[curFrag][kfSymbol] = 'bf and
frags[curFrag][kfaddr] > frags[curFrag][kfBranch] and curFrag <> 0 and
frags[curFrag - 1][kfSymbol] = 'pophandlers and
                    frags[curFrag + 1][kfSymbol] = 'bra then
                begin
        if vars.debug = 'dumpforeachcollect or vars.debug = 'dumpall then
        begin
        if vars.debug = 'dumpall then print("foreach collect construct");
        print(frags);
        print(curFrag);
        end;
                    ArrayRemoveCount(frags, curFrag, 1);
                    While curFrag > -1 and not
StrPos(frags[curFrag][kfText], "NewIterator(", 0) do
                        curFrag := curFrag - 1;
                    s := " in " & GetIterator(frags[curFrag][kfText]) & "
collect ";
                    startAddr := frags[curFrag][kfaddr];
                    while frags[curFrag][kfSymbol] <> 'bra do
                    begin
                        nextFrag := ArrayPos(args,
GetFirstWord(frags[curFrag][kfText]), 0, WordTest);
                        if nextFrag then
                            args[nextFrag][kfText] := true;
                        ArrayRemoveCount(frags, curFrag, 1);
                    end;
                    ArrayRemoveCount(frags, curFrag, 1);
                    s := GetFirstWord(frags[curFrag][kfText]) & s;
                    nextFrag := ArrayPos(args,
GetFirstWord(frags[curFrag][kfText]), 0, WordTest);
                    if nextFrag then
                            args[nextFrag][kfText] := true;
                    ArrayRemoveCount(frags, curFrag, 1);
                    if StrPos(frags[curFrag][kfText], "|iter", 0) then
                    begin
                        s := GetFirstWord(frags[curFrag][kfText]) & ", " & s;
                        nextFrag := ArrayPos(args,
GetFirstWord(frags[curFrag][kfText]), 0, WordTest);
                        if nextFrag then
                            args[nextFrag][kfText] := true;
                        ArrayRemoveCount(frags, curFrag, 1);
                    end;
                    nextFrag := StrPos(frags[curFrag][kfText], ":= ", 0);
                    if nextFrag then
                    begin
                        s := s & SubStr(frags[curFrag][kfText], nextFrag + 3,
Length(frags[curFrag][kfText]) - (nextFrag + 4));
                        ArrayRemoveCount(frags, curFrag, 1);
                    end;
                    while frags[curFrag][kfSymbol] <> 'bra do
                        ArrayRemoveCount(frags, curFrag, 1);
                    brAddr := frags[curFrag][kfBranch];
```

60

```
                while frags[curFrag][kfaddr] <> brAddr do
                    ArrayRemoveCount(frags, curFrag, 1);
                nextFrag := StrPos(frags[curFrag][kfText], ":= ", 0);
                if nextFrag then
                    frags[curFrag][kfText] :=
SubStr(frags[curFrag][kfText], 0, nextFrag + 3) & "foreach " & s;
                frags[curFrag][kfaddr] := startAddr;
            end;
            curFrag := curFrag + 1;
        end;

// handle normal foreach
        curFrag := 0;
        while curFrag < Length(frags) - 1 do
        begin
            if frags[curFrag][kfSymbol] = 'bf and
frags[curFrag][kfaddr] > frags[curFrag][kfBranch] and curFrag <> 0 and
frags[curFrag - 1][kfSymbol] = 'pophandlers then
            begin
        if vars.debug = 'dumpforeach or vars.debug = 'dumpall then
        begin
        if vars.debug = 'dumpall then print("foreach construct");
        print(frags);
        print(curFrag);
        end;
                        // get the position to start looking back from
for the begining and remove the branch back line
                    brAddr := frags[curFrag][kfBranch];
                ArrayRemoveCount(frags, curFrag, 1);
                if StrEqual(frags[curFrag][kfText], "nil") and
frags[curFrag][kfSymbol] = 'brapop then
                    ArrayRemoveCount(frags, curFrag, 1);

// find the begining of the foreach statement
                curFrag := ArrayPos(frags, brAddr, 0, AddrTest);
                While curFrag > -1 and not
StrPos(frags[curFrag][kfText], "NewIterator(", 0) do
                    curFrag := curFrag - 1;
                s := " in " & GetIterator(frags[curFrag][kfText]) & "
do\n\tbegin\n\t";
                startAddr := frags[curFrag][kfaddr];

// remove the auto variables from the args array until
the initial branch point
                while frags[curFrag][kfSymbol] <> 'bra do
                begin
                    nextFrag := ArrayPos(args,
GetFirstWord(frags[curFrag][kfText]), 0, WordTest);
                    if nextFrag then
                        args[nextFrag][kfText] := true;
                    ArrayRemoveCount(frags, curFrag, 1);
                end;

// get the address of the end line and remove the branch
                brAddr := frags[curFrag][kfBranch];
                ArrayRemoveCount(frags, curFrag, 1);

// get the auto variables and set the fragment
text
                s := GetFirstWord(frags[curFrag][kfText]) & s;
                nextFrag := ArrayPos(args,
GetFirstWord(frags[curFrag][kfText]), 0, WordTest);
                if nextFrag then
```

61

```
                args[nextFrag][kfText] := true;
            if StrPos(frags[curFrag + 1][kfText], "|iter", 0) then
            begin
                s := GetFirstWord(frags[curFrag + 1][kfText]) & ", "
& s;
                nextFrag := ArrayPos(args,
GetFirstWord(frags[curFrag][kfText]), 0, WordTest);
                if nextFrag then
                    args[nextFrag][kfText] := true;
                ArrayRemoveCount(frags, curFrag + 1, 1);
            end;
            frags[curFrag][kfText] := "foreach " & s;
            frags[curFrag][kfaddr] := startAddr;

// set the text for the end of the loop
            curFrag := ArrayPos(frags, brAddr, 0, AddrTest) - 1;
            ArrayRemoveCount(frags, curFrag + 1, 1);
            frags[curFrag][kfText] := "end";
            frags[curFrag][kfSymbol] := 'feend;
        end;
        curFrag := curFrag + 1;
    end;

// repeat construct
    curFrag := 0;
    while curFrag < Length(frags) - 1 do
    begin
        if frags[curFrag][kfSymbol] = 'bf and
frags[curFrag][kfaddr] > frags[curFrag][kfBranch] then
        begin
    if vars.debug = 'dumprepeat or vars.debug = 'dumpall then
    begin
    if vars.debug = 'dumpall then print("repeat construct");
    print(frags);
    print(curFrag);
    end;
            frags[curFrag][kfText] := "until " &
frags[curFrag][kfText];
            frags[curFrag][kfSymbol] := 'looop;
            brAddr := frags[curFrag][kfBranch];
            nextFrag := ArrayPos(frags, brAddr, 0, AddrTest);
            if nextFrag then
                frags[nextFrag][kfText] := if
StrLen(frags[nextFrag][kfText]) > 0 then "repeat\n\t" &
frags[nextFrag][kfText] else "repeat";
        end;
        curFrag := curFrag + 1;
    end;

// while construct
    curFrag := 0;
    while curFrag < Length(frags) - 1 do
    begin
        if frags[curFrag][kfSymbol] = 'bt and
frags[curFrag][kfaddr] > frags[curFrag][kfBranch] then
        begin
    if vars.debug = 'dumpwhile or vars.debug = 'dumpall then
    begin
    if vars.debug = 'dumpall then print("while construct");
    print(frags);
    print(curFrag);
    end;
```

62

```
                    s := "while " & frags[curFrag][kfText] & "
do\n\tbegin\n\t";
                    frags[curFrag][kfText] := "end";
                    frags[curFrag][kfSymbol] := 'looop;
                    brAddr := frags[curFrag][kfBranch];
                    nextFrag := ArrayPos(frags, brAddr, 0, AddrTest);
                    if nextFrag then
                    begin
                        frags[nextFrag][kfText] := s &
frags[nextFrag][kfText];
                        if frags[nextFrag - 1][kfSymbol] = 'bra and
frags[nextFrag - 1][kfBranch] = frags[curFrag][kfaddr] then
                        begin
                            frags[nextFrag][kfaddr] := frags[nextFrag -
1][kfaddr];
                            ArrayRemoveCount(frags, nextFrag - 1, 1);
                            curFrag := curFrag - 1;
                        end;
                    end;
                end;
            curFrag := curFrag + 1;
        end;

// for construct
        curFrag := 0;
        while curFrag < Length(frags) - 1 do
        begin
            if frags[curFrag][kfSymbol] = 'forLoop then
            begin
    if vars.debug = 'dumpfor or vars.debug = 'dumpall then
    begin
    if vars.debug = 'dumpall then print("for construct");
    print(frags);
    print(curFrag);
    end;
                brAddr := frags[curFrag][kfBranch];
                frags[curFrag][kfText] := "end";
                frags[curFrag][kfSymbol] := 'looop;
                nextFrag := ArrayPos(frags, brAddr, 0, AddrTest);
                if nextFrag then
                begin
                    loopvar := frags[nextFrag - 2][kfText];
                    ArrayRemoveCount(frags, nextFrag - 2, 2);
                    curFrag := curFrag - 2;
                    nextFrag := nextFrag - 3;
                    s := " do\n\tbegin\n\t";
                    if StrPos(frags[nextFrag][kfText], loopvar & "|incr",
0) then
                    begin
                        s := " by " & GetLastWord(frags[nextFrag][kfText])
& s;
                        ArrayRemoveCount(frags, nextFrag, 1);
                        curFrag := curFrag - 1;
                        nextFrag := nextFrag - 1;
                    end;
                    s := GetLastWord(frags[nextFrag][kfText]) & s;
                    ArrayRemoveCount(frags, nextFrag, 1);
                    curFrag := curFrag - 1;
                    nextFrag := nextFrag - 1;
                    s := "for " & frags[nextFrag][kfText] & " to " & s;
    /*
                    frags[nextFrag + 1][kfaddr] :=
frags[nextFrag][kfaddr];
```

```
                    ArrayRemoveCount(frags, nextFrag, 1);
                    curFrag := curFrag - 1;
                    frags[nextFrag][kfText] := s &
frags[nextFrag][kfText];
     */
                            frags[nextFrag][kfText] := s;
                            frags[nextFrag][kfSymbol] := 'foor;
                    if frags[curFrag - 1][kfSymbol] = 'incrVar then
                        ArrayRemoveCount(frags, curFrag - 1, 1);
                    if StrEqual(frags[curFrag - 2][kfText], loopvar &
"|incr") then
                            ArrayRemoveCount(frags, curFrag - 2, 1);
                    nextFrag := ArrayPos(args, loopvar & "|incr", 0,
WordTest);
                    if nextFrag then
                        args[nextFrag][kfText] := true;
                    nextFrag := ArrayPos(args, loopvar & "|limit", 0,
WordTest);
                    if nextFrag then
                        args[nextFrag][kfText] := true;
                 end;
              end;
              curFrag := curFrag + 1;
          end;

// break statement
          curFrag := 0;
          while curFrag < Length(frags) - 1 do
          begin
              if frags[curFrag][kfSymbol] = 'bra then
                  begin
          if vars.debug = 'dumpbreak or vars.debug = 'dumpall then
          begin
          if vars.debug = 'dumpall then print("break construct");
          print(frags);
          print(curFrag);
          end;
                  brAddr := frags[curFrag][kfBranch];
                  nextFrag := ArrayPos(frags, brAddr, 0, AddrTest);
                  if not nextFrag then
                     nextFrag := ArrayPos(frags, brAddr + 1, 0, AddrTest);
                  if nextFrag and frags[nextFrag - 1][kfSymbol] = 'looop
then
                  begin
                      frags[curFrag][kfText] := "break" & if not
StrEqual(frags[curFrag][kfText], "nil") then " " &
frags[curFrag][kfText];
                      frags[curFrag][kfSymbol] := 'setvar;
                      if frags[curFrag + 1][kfSymbol] = 'bra then
                          if not ArrayPos(frags, frags[curFrag +
1][kfBranch], 0, AddrTest) and curFrag + 1 < Length(frags) then
                              ArrayRemoveCount(frags, curFrag + 1, 1);
                  end;
              end;
              curFrag := curFrag + 1;
          end;

// if statements
          curFrag := Length(frags) - 1;
          while curFrag > -1 do
          begin
                  if curFrag > Length(frags) - 1 then
                      curFrag := Length(frags) - 1;
```

64

```
                        if curFrag > 0 and frags[curFrag - 1][kfSymbol] = 'bra
then
                        begin
                                if StrEqual(frags[curFrag][kfText], "nil") then
                                        brAddr := frags[curFrag - 1][kfBranch] -
1;
                                else
                                        brAddr := frags[curFrag - 1][kfBranch] -
3;
                        end
                        else
                                brAddr := -1;
        //        if (frags[curFrag][kfSymbol] = 'bf or
frags[curFrag][kfSymbol] = 'bt) and (curFrag < 3 or (curFrag > 2 and
frags[curFrag - 3][kfSymbol] <> 'bf and frags[curFrag - 3][kfSymbol] <>
'bt) or frags[curFrag - 1][kfSymbol] = 'bt or frags[curFrag -
1][kfSymbol] = 'bf) then
                if (frags[curFrag][kfSymbol] = 'bf or
frags[curFrag][kfSymbol] = 'bt) and frags[curFrag][kfaddr] <> brAddr
then
                begin
        if vars.debug = 'dumpif or vars.debug = 'dumpall then
        begin
        if vars.debug = 'dumpall then print("if construct");
        print(frags);
        print(curFrag);
        end;
                        startAddr := frags[curFrag][kfaddr];
                        if frags[curFrag + 2][kfSymbol] = 'bra and frags[curFrag
+ 2][kfBranch] <> exitAddr and (frags[curFrag + 3][kfSymbol] = 'bt or
frags[curFrag + 3][kfSymbol] = 'bf) and (frags[curFrag + 3][kfaddr] + 1
= frags[curFrag + 2][kfBranch] or frags[curFrag + 3][kfaddr] + 3 =
frags[curFrag + 2][kfBranch]) then
                        begin
                                s := "if " & frags[curFrag][kfText] & if
frags[curFrag][kfSymbol] = 'bf then " and " else " or ";
                                ArrayRemoveCount(frags, curFrag, 1);
                                while frags[curFrag + 2][kfSymbol] = 'bf or
frags[curFrag + 2][kfSymbol] = 'bt do
                                        if frags[curFrag + 4][kfSymbol] = 'bra and
frags[curFrag + 4][kfBranch] <> exitAddr and (frags[curFrag + 5][kfaddr]
+ 1 = frags[curFrag + 4][kfBranch] or frags[curFrag + 5][kfaddr] + 3 =
frags[curFrag + 4][kfBranch]) then
                                        begin
                                                s := s & frags[curFrag][kfText] & if
frags[curFrag + 2][kfSymbol] = 'bf then " and " else " or ";
                                                ArrayRemoveCount(frags, curFrag, 3);
                                        end;
                                        else
                                        begin
                                                s := s & frags[curFrag][kfText] & " then\n\t";
                                                ArrayRemoveCount(frags, curFrag, 2);
                                        end;
                        end
                        else
                                s := "if " & frags[curFrag][kfText] & " then\n\t\t";
                        brAddr := if frags[curFrag][kfSymbol] = 'brapop then
frags[curFrag + 1][kfBranch] else frags[curFrag][kfBranch];
                        nextFrag := ArrayPos(frags, brAddr, curFrag, AddrTest);
                        if not nextFrag and brAddr = exitAddr then
                                nextFrag := length(frags) - 1;
        if vars.debug = 'dumpelse then
        begin
```

```
            print(frags);
            print(s);
            print(curFrag);
            print(nextFrag);
            print(brAddr);
            print(exitAddr);
            end;
                        if nextFrag then
                        begin
                            nextFrag := nextFrag - 1;
                            if frags[nextFrag][kfSymbol] = 'bra then
                            begin
                                brAddr := frags[nextFrag][kfBranch];
                                k := ArrayPos(frags, brAddr, nextFrag, AddrTest);
                                if not k and brAddr = exitAddr then
                                        k := length(frags) - 1;
                                if k then
                                begin
                                   if k - 1 = nextFrag then
                                   begin
                                        frags[k][kfText] := "else\n\t" &
frags[nextFrag + 1][kfText];
                                        ArrayRemoveCount(frags, nextFrag, 1);
                                   end
                                    else if k - 2 = nextFrag then
                                    begin
                                        frags[nextFrag][kfText] := "else\n\t" &
frags[nextFrag + 1][kfText];
                                        frags[nextFrag][kfSymbol] := frags[nextFrag
+ 1][kfSymbol];
                                        ArrayRemoveCount(frags, k - 1, 1);
                                    end
                                    else
                                    begin
                                        frags[nextFrag + 1][kfText] :=
"else\n\tbegin\n\t" & frags[nextFrag + 1][kfText];
                                        if brAddr <> exitAddr then
                                        begin
                                           if StrEqual(frags[k - 1][kfText], "nil")
and frags[k - 1][kfSymbol] = 'brapop then
                                                frags[k - 1][kfText] := "end";
                                            else
                                                frags[k - 1][kfText] := frags[k -
1][kfText] & ";\n\t\end";
                                        end
                                          else
                                          begin
                                            if StrEqual(frags[k][kfText], "nil") and
frags[k][kfSymbol] = 'brapop then
                                                frags[k][kfText] := "end";
                                            else
                                                frags[k][kfText] := frags[k][kfText]
& ";\n\t\end";
                                          end;
                                          ArrayRemoveCount(frags, nextFrag, 1);
                                    end;
                                end;
                            end;
                            if curFrag + 2 = nextFrag then
                            begin
                                s := s & frags[nextFrag - 1][kfText] & "\n\t";
                                ArrayRemoveCount(frags, nextFrag - 1, 1);
                            end
                            else
```

66

```
                        begin
                            if StrEqual(frags[nextFrag - 1][kfText], "nil")
and frags[nextFrag - 1][kfSymbol] = 'brapop then
                                frags[nextFrag - 1][kfText] := "end";
                            else
                                frags[nextFrag - 1][kfText] :=
frags[nextFrag - 1][kfText] & ";\n\t\end";
                            s := s & "begin\n\t";
                        end;
                    end
//              else if frags[nextFrag + 1][kfSymbol] = 'ifstmt
then
//                  begin
//                      frags[nextFrag + 1][kfText] := "else " &
frags[nextFrag + 1][kfText];
//                      frags[nextFrag + 1][kfSymbol] := 'elseif;
//                  end
                    else if curFrag + 1 <> nextFrag then
                    begin
                        if StrEqual(frags[nextFrag][kfText], "nil") and
frags[nextFrag][kfSymbol] = 'brapop then
                            frags[nextFrag][kfText] := "end";
                        else
                            frags[nextFrag][kfText] :=
frags[nextFrag][kfText] & ";\n\t\end";
                        s := s & "begin\n\t";
                    end;
                    else
                        s := s & $\t;
                end;
                ArrayRemoveCount(frags, curFrag, 1);
                frags[curFrag][kfaddr] := startAddr;
                frags[curFrag][kfText] := s & frags[curFrag][kfText];
                    frags[curFrag][kfSymbol] := 'ifstmt;
              end;
            curFrag := curFrag - 1;
          end;

// do some final cleanup

// remove the auto variables that the user did not also
declare
          while (args[Length(args) - 1][kfText]) do
                SetLength(args, Length(args) - 1);

curFrag := 0;
          while curFrag < Length(frags) - 1 do
          begin
            if frags[curFrag][kfSymbol] = 'looop and frags[curFrag -
1][kfSymbol] = 'pop then
              begin
                if not StrPos(frags[curFrag - 1][kfText], " ", 0) and
ArrayPos(args, frags[curFrag - 1][kfText], 0, WordTest) then
                  begin
                      curFrag := curFrag - 1;
                      ArrayRemoveCount(frags, curFrag, 1);
                  end;
              end;
            curFrag := curFrag + 1;
          end;

for curFrag := Length(frags) - 1 to 0 by -1 do
```

67

```
              if StrLen(frags[curFrag][kfText]) = 0 or
StrEqual(frags[curFrag][kfText], "nil") then
                ArrayRemoveCount(frags, curFrag, 1);

// Now build the function back up from the frags array
        if vars.debug = 'dumpfinal then
        begin
        if vars.debug = 'dumpall then print("final");
        print(frags);
        end;
           s := "func(";
           if f.NumArgs > 0 then
              for curFrag := 3 to f.NumArgs + 2 do
              begin
                 s := s & args[curFrag][kfaddr];
                 if curFrag < f.numArgs + 2 then
                    s := s & ", ";
              end;
           s := s & ")\nbegin";

// Add the remaining local variables
        for curFrag := f.NumArgs + 3 to Length(args) - 1 do
             s := s & "\n\tlocal\t" &
MakeValidSymbol(args[curFrag][kfaddr]) & ";";
           s := s & "\n";

// process each of the frags
        for curFrag := 0 to length(frags) - 1 do
        begin
           frags[0][kfText] := TrimString(frags[0][kfText]);
           if frags[0][kfText][0] = $; then
                 frags[0][kfText] := SubStr(frags[0][kfText], 1,
StrLen(frags[0][kfText]) - 1);
           nextFrag := StrLen(frags[0][kfText]);
           if nextFrag > 0 then
           begin
                 if nextFrag < 7 or (nextFrag > 6 and not
StrEqual("begin\n\t", SubStr(frags[0][kfText], nextFrag - 7, 7))) then
                       frags[0][kfText] := frags[0][kfText] & $;;
                 s := s & "\n\t" & TrimString(frags[0][kfText]);
                 end;
             ArrayRemoveCount(frags, 0, 1);
          end;
          s := s & "\nend";

// Remove lines with only nil
           k := StrPos(s, "begin\n\tnil;\n", 0);
           while k do
           begin
                 s := StrMunger(s, k + 5, 6, nil, 0, 0);
                 k := StrPos(s, "begin\n\tnil;\n", k + 1);
           end;

// Trim ; off of begins
           k := StrPos(s, "begin;", 0);
           while k do
           begin
                 s := StrMunger(s, k + 5, 1, nil, 0, 0);
                 k := StrPos(s, "begin;", k + 1);
           end;

return PrettyUpFunc(s);
    end,
```

```
    disasm:
      func(f)
      begin
          local i, j, k, b, c;
          local s := "\n";
          local t := "";
          local cf := f;
          local args := [args:];
          local lits := [literals:];
          local handlers := [];
          local OpTable :=  [0x00, "pop", 0x01, "return", 0x02, "push-
self", 0x03, "set-lex-scope", 0x04, "iter-next", 0x05, "iter-done",
0x06, "pop-handlers", 0x07, "call-handlers",
                                0x08, "unary2 ", 0x10, "unary3 ",
0x18, "push ", 0x20, "push-constant ", 0x28, "call ", 0x30, "invoke ",
0x38, "send ", 0x40, "send-if-defined ",
                                0x48, "resend ", 0x50, "resend-if-
defined ", 0x58, "branch ", 0x60, "branch-t ", 0x68, "branch-f ", 0x70,
"find-var ", 0x78,"get-var ",
                                0x80, "make-frame ", 0x88, "make-
array ", 0x90, "get-path ", 0x98, "set-path ", 0xa0, "set-var ", 0xa8,
"set-find-var ", 0xb0, "incr-var ",
                                0xb8, "branch-if-loop-done ", 0xc0,
"freq-func ", 0xc8, "new-handlers "];
          local freqFuncTable := [0, "0 [+/2]", 1, "1 [-/2]", 2, "2
[aref/2]", 3, "3 [setAref/3]", 4, "4 [=/2]", 5, "5 [not/1]", 6, "6
[<>/2]", 7, "7 [*/2]",
                                        8, "8 [//2]", 9, "9
[div/2]", 10, "10 [</2]", 11, "11 [>/2]", 12, "12 [>=/2]", 13, "13
[<=/2]", 14, "14 [band/2]", 15, "15 [bor/2]",
                                        16, "16 [bnot/2]", 17, "17
[newiterator/2]", 18, "18 [length/1]", 19, "19 [clone/1]", 20, "20
[setClass/2]", 21, "21 [addArraySlot/2]",
                                        22, "22 [stringer/1]", 23,
"23 [hasPath/2]", 24, "24 [ClassOf/1]"];

// Convert the argFrame to a list of slot names
                foreach slot, val in cf.argFrame do
                    AddArraySlot(args, SPrintObject(slot));

if cf.literals then
                    foreach val in cf.literals do
                        if ClassOf(val) = 'pathExpr then
                            AddArraySlot(lits, PrintPathExpr(val));
                        else if ClassOf(val) = 'CodeBlock then
                            AddArraySlot(lits, DumpCode(val));
                        else if ClassOf(val) = 'String then
                            AddArraySlot(lits, "\"" & val & "\"");
                        else
                            AddArraySlot(lits, SPrintObject(val));

try
                for i := 0 to length(cf.instructions) - 1 do
                begin
                    s := MakeHexWord(i) & ": ";
                    b := ExtractByte(cf.instructions, i);
                    c := band(b, 7);
                    if c = 7 then
                    begin
                        c := ExtractWord(cf.instructions, i + 1);
                        i := i + 2;
                        s := s & MakeHexByte(b) && MakeHexWord(c) & " ";
                    end
```

```
                        else
                            s := s & MakeHexByte(b) & "     ";
                        k := band(b, 0xf8);

// Handle all of the simple lookup opcodes first
                        if k = 0x00 then
                            s := s & TableLookup(OpTable, b) & $\n;
                        else if k = 0x18 or k = 0x70 or k = 0xA8 then // handle all
of the literal routines the same way
                            s := s & TableLookup(OpTable, k) & lits[c] & $\n;
                        else if k = 0x20 then
                        begin
                            s := s & TableLookup(OpTable, k);
                            if c mod 4 = 0 then
                                s := s & c div 4 & $\n;
                            else if c mod 4 = 2 then
                            begin
                                c := c div 16;
                                if c = 0 then
                                    t := "nil";
                                else if c = 1 then
                                    t := "true";
                                else if c = 9 then
                                    t := "$\\t";
                                else if c = 13 then
                                    t := "$\\n";
                                else if c = 92 then
                                    t := "$\\\\";
                                else if c < 33 or c > 126 then
                                    t := "$\\u" & MakeHexWord(c);
                                else
                                    t := "$" & CHR(c);
                                s := s & t & $\n;
                            end;
                            else if c mod 4 = 3 then
                                s := s & PrintMagicPtr(c) & $\n;
                        end;
                        else if k >= 0x58 and k <= 0x68 then // handle all of the
branch instructions the same
                            s := s & TableLookup(OpTable, k) & MakeHexWord(c) & $\n;
                        else if k = 0x78 or k = 0xA0 then // handle all fo the
argFrame variables the same
                            s := s & TableLookup(OpTable, k) & $[ & args[c] & "]\n";
                        else if k = 0xC0 then // frequent functions
                            s := s & TableLookup(OpTable, k) &
TableLookup(freqFuncTable, c) & $\n;
                        else // k = 0x08 or k = 0x10 or (k >= 0x28 and k <= 0x50)
or (k >= 0x80 and k <= 0x98) or k = 0xB0 or k = 0xB8 or k = 0xC8
                            s := s & TableLookup(OpTable, k) & c & $\n;
                        write(s);
                    end;
                    onexception |evt.ex.fr| do
                    begin
                        print("Exception at offset " & MakeHexWord(band(i,
0x00ffff)) & " instruction " & MakeHexByte(b));
                    end;
                    write($\n);
                end,
            PrintPathExpr:
                func(pe)
                begin
                    local i;
                    local s := SPrintObject(pe[0]);
```

70

```
        for i := 1 to Length(pe) - 1 do
            s := s & "." & pe[i];

return s;
      end,
PrintMagicPtr:
  func(ref)
  begin
      local description;
      local mpt := [0, "ROM_action_list",
  1, "ROM_addresseeslip",
  2, "ROM_addressview",
  3, "ROM_alarmqueryspec",
  4, "ROM_alarmwakeup",
  5, "ROM_analogclock",
  6, "ROM_asciibreak",
  7, "ROM_asciishift",
  8, "ROM_assistframes",
  9, "ROM_backupslip",
 10, "ROM_badaddressmessage",
 11, "ROM_bcbates",
 12, "ROM_bccarlton",
 13, "ROM_bchopkins",
 14, "ROM_bcritz",
 15, "ROM_blackbirdservicename",
 16, "ROM_bootsound",
 17, "ROM_calculator",
 18, "ROM_calendar",
 19, "ROM_calendarlist",
 20, "ROM_calendarmailslip",
 21, "ROM_calendarmeta",
 22, "ROM_calendarnotesname",
 23, "ROM_calendarsoupname",
 24, "ROM_calendarstrings",
 25, "ROM_calendarstuff",
 26, "ROM_calibrationquery",
 27, "ROM_callslip",
 28, "ROM_canonicalcompass",
 29, "ROM_canonicalcontext",
 30, "ROM_canonicalcorrector",
 31, "ROM_canonicaldatacontext",
 32, "ROM_canonicaldate",
 33, "ROM_canonicalgroup",
 34, "ROM_canonicalgroupee",
 35, "ROM_canonicalpopup",
 36, "ROM_canonicalrect",
 37, "ROM_canonicalscrollee",
 38, "ROM_canonicalscroller",
 39, "ROM_canonicaltable",
 40, "ROM_canonicaltextblock",
 41, "ROM_canonicaltitle",
 42, "ROM_capslocklight",
 43, "ROM_cardfile",
 44, "ROM_cardfileindices",
 45, "ROM_cardfilemeta",
 46, "ROM_cardfilequeryspec",
 47, "ROM_cardfilesoupname",
 48, "ROM_charsversion",
 49, "ROM_checkingmessage",
 50, "ROM_cities",
 51, "ROM_click",
 52, "ROM_closestorerelatedforms",
```

7 1

```
 53, "ROM_cloud1",
 54, "ROM_cloud2",
 55, "ROM_cloud3",
 56, "ROM_connectmessage",
 57, "ROM_containername",
 58, "ROM_copperfield",
 59, "ROM_countries",
 60, "ROM_coverpageformat",
 61, "ROM_cribnote",
 62, "ROM_crumple",
 63, "ROM_dataname",
 64, "ROM_dateindices",
 65, "ROM_datequeryspec",
 66, "ROM_datetimestrspecs",
 67, "ROM_dayview",
 68, "ROM_dialtones",
 69, "ROM_dictionaries",
 70, "ROM_dictionarylist",
 71, "ROM_disconnectmessage",
 72, "ROM_dockerchooser",
 73, "ROM_dockerrecentchooser",
 74, "ROM_dockingmsg",
 75, "ROM_downloadingmessage",
 76, "ROM_drawerclose",
 77, "ROM_draweropen",
 78, "ROM_edgedrawer",
 79, "ROM_errortable",
 80, "ROM_espyfont",
 81, "ROM_faxdriver",
 82, "ROM_faxheader",
 83, "ROM_faxslip",
 84, "ROM_filingslip",
 85, "ROM_flip",
 86, "ROM_folderlistquery",
 87, "ROM_fontsystem10",
 88, "ROM_fontsystem10bold",
 89, "ROM_fontsystem10underline",
 90, "ROM_fontsystem12",
 91, "ROM_fontsystem12bold",
 92, "ROM_fontsystem12underline",
 93, "ROM_fontsystem14",
 94, "ROM_fontsystem14bold",
 95, "ROM_fontsystem14underline",
 96, "ROM_fontsystem18",
 97, "ROM_fontsystem18bold",
 98, "ROM_fontsystem18underline",
 99, "ROM_fontsystem9",
100, "ROM_fontsystem9bold",
101, "ROM_fontsystem9underline",
102, "ROM_funbeep",
103, "ROM_genericprintererror",
104, "ROM_genevafont",
105, "ROM_gtpens",
106, "ROM_gtscenes",
107, "ROM_handwritingpracticepreferencesform",
108, "ROM_helpbook",
109, "ROM_helveticafont",
110, "ROM_hilitesound",
111, "ROM_inboxsoupname",
112, "ROM_initialinheritanceframe",
113, "ROM_initscripts",
114, "ROM_ioindices",
115, "ROM_letters",
```

72

```
116, "ROM_letterweightquery",
117, "ROM_loadcalibration",
118, "ROM_loadglobals",
119, "ROM_loadletterweights",
120, "ROM_maileditor",
121, "ROM_mailregister",
122, "ROM_mailslip",
123, "ROM_maintodo",
124, "ROM_makecardfilesoup",
125, "ROM_meeting",
126, "ROM_meetingname",
127, "ROM_messagenotification",
128, "ROM_metaarray",
129, "ROM_metasoupname",
130, "ROM_netchooser",
131, "ROM_newyorkfont",
132, "ROM_nomessage",
133, "ROM_notepaper",
134, "ROM_notesslip",
135, "ROM_notification",
136, "ROM_notifyicon",
137, "ROM_onlinemessages",
138, "ROM_onlineservices",
139, "ROM_outboxsoupname",
140, "ROM_pagefooter",
141, "ROM_pagepreviewform",
142, "ROM_paperrollindices",
143, "ROM_paperrollmeta",
144, "ROM_paperrollsoupname",
145, "ROM_paragraphcodebook2",
146, "ROM_phoneclasses",
147, "ROM_phonelabels",
148, "ROM_phonetext",
149, "ROM_phoneview",
150, "ROM_plinkbeep",
151, "preparingmessage",
152, "primarynameview",
153, "printerchooserbutton",
154, "printerserialpicker",
155, "printpagemessage",
156, "printslip",
157, "protoapp",
158, "protobook",
159, "protobookmark",
160, "protoborder",
161, "protobottomtitle",
162, "protocalendaroverview",
163, "protocancelbutton",
164, "protocheckbox",
165, "protocheckboxicon",
166, "protoclosebox",
167, "protocorrectcontext",
168, "protocorrector",
169, "protocursivecheckbox",
170, "protodateexpando",
171, "protodictionary",
172, "protodivider",
173, "protodrawer",
174, "protoendpoint",
175, "protoexpandoshell",
176, "protofilingbutton",
177, "protofindcategory",
178, "protofinditem",
```

73

```
179, "protofloater",
180, "protofloatngo",
181, "protoformulaoptioncheckbox",
182, "protogauge",
183, "protoglance",
184, "protohilitebutton",
185, "protoinputline",
186, "protoiocategory",
187, "protokeyboard",
188, "protokeypad",
189, "protolabelinputline",
190, "protolabelpicker",
191, "protooverview",
192, "protooverviews",
193, "protoparagraph",
194, "protophoneexpando",
195, "protopicker",
196, "protopictindexer",
197, "protopictradiobutton",
198, "protopicturebutton",
199, "protopolygon",
200, "protoprintformat",
201, "protoprintpage",
202, "protoradiobutton",
203, "protoradiocluster",
204, "protorcheckbox",
205, "protorecognitioncheckbox",
206, "protoroll",
207, "protorollbrowser",
208, "protorollitem",
209, "protoroutingslip",
210, "protosetclock",
211, "protoshowbar",
212, "protoslider",
213, "protosmartaddressline",
214, "protosmartdateline",
215, "protosmartemailline",
216, "protosmartnameline",
217, "protosmartphoneline",
218, "protostatictext",
219, "protostatus",
220, "protostatusbar",
221, "protostorycard",
222, "protostrokesitem",
223, "prototable",
224, "prototabledef",
225, "prototableentry",
226, "prototextbutton",
227, "prototextexpando",
228, "prototextlist",
229, "prototitle",
230, "protozonestable",
231, "ROM_ramarraysetup",
232, "ROM_ramframesetup",
233, "ROM_readingmessage",
234, "ROM_rectoggle",
235, "ROM_remindslip",
236, "ROM_removeform",
237, "ROM_removeoldmeetingsform",
238, "ROM_repeatindices",
239, "ROM_repeatmeetingname",
240, "ROM_repeatmeetingsmeta",
241, "ROM_repeatnotesmeta",
```

74

```
242, "ROM_repeatnotesname",
243, "ROM_repeatqueryspec",
244, "ROM_reviewdict",
245, "ROM_romavailableprinters",
246, "ROM_rominternational",
247, "ROM_rommetadata",
248, "ROM_romphrasallexicon",
249, "ROM_salutationsuffix",
250, "ROM_savecalibration",
251, "ROM_savedframes",
252, "ROM_saveletterweights",
253, "ROM_scheduleslip",
254, "ROM_scheduleview",
255, "ROM_searchprefix",
256, "ROM_searchsuffix",
257, "ROM_secondarynameview",
258, "ROM_sendmeeting",
259, "ROM_sendmessage",
260, "ROM_setupnewform",
261, "ROM_shapename",
262, "ROM_simplebeep",
263, "ROM_soundoff",
264, "ROM_standardstyles",
265, "ROM_starterclipboard",
266, "ROM_starterink",
267, "ROM_starterparagraph",
268, "ROM_starterpolygon",
269, "ROM_stdforms",
270, "ROM_stopwordlist2",
271, "ROM_stopwordlist3",
272, "ROM_symbolfont",
273, "ROM_systemfont",
274, "ROM_systempsfont",
275, "ROM_systemsoupindexes",
276, "ROM_systemsoupname",
277, "ROM_systemsymbolfont",
278, "ROM_timesromanfont",
279, "ROM_todoitem",
280, "ROM_todometa",
281, "ROM_todoname",
282, "ROM_todosoupname",
283, "ROM_unicode",
284, "ROM_uploadingmessage",
285, "ROM_userconfiguration",
286, "ROM_userdictquery",
287, "ROM_viewroot",
288, "ROM_waitingmessage",
289, "ROM_wakeupbeep",
290, "ROM_wizardimport",
291, "ROM_wizbadtitle",
292, "ROM_wizdatestitle",
293, "ROM_wizfinished",
294, "ROM_wizimporting",
295, "ROM_wiznamestitle",
296, "ROM_wiznotestitle",
297, "ROM_wizreceiving",
298, "ROM_worldclock",
299, "ROM_zapconfirmmsg",
300, "ROM_zapnomsg",
301, "ROM_zapreceiveconfirm",
302, "ROM_zaprecvcancelmsg",
303, "ROM_zaprecvconnectmsg",
304, "ROM_zaprecvdonemsg",
```

75

```
305,   "ROM_zaprecvmsg",
306,   "ROM_zapsendconnectmsg",
307,   "ROM_zapsenddonemsg",
308,   "ROM_zapsendmsg",
309,   "ROM_zapslip",
310,   "ROM_zonechooser",
311,   "ROM_cancelbitmap",
312,   "ROM_routingbitmap",
313,   "ROM_plunk",
314,   "ROM_poof",
315,   "protobatterygauge",
316,   "protolabeledbatterygauge",
317,   "ROM_todooverview",
318,   "protoincategory",
319,   "protooutcategory",
320,   "ROM_bootlogobitmap",
321,   "ROM_worldmapbitmap",
322,   "ROM_phonebitmap",
323,   "ROM_upbitmap",
324,   "ROM_downbitmap",
325,   "ROM_leftbitmap",
326,   "ROM_rightbitmap",
327,   "ROM_uparrowbitmap",
328,   "ROM_downarrowbitmap",
329,   "ROM_overviewbitmap",
330,   "ROM_globebitmap",
331,   "ROM_keycapsbitmap",
332,   "ROM_keybuttbitmap",
333,   "ROM_calculatorbitmap",
334,   "ROM_goawaybitmap",
335,   "ROM_palettebitmap",
336,   "ROM_inboxbitmap",
337,   "ROM_outboxbitmap",
338,   "ROM_dockerbitmap",
339,   "ROM_wizardbitmap",
340,   "ROM_ntpbitmap",
341,   "ROM_clipbitmap",
342,   "ROM_markupbitmap",
343,   "ROM_nomarkupbitmap",
344,   "ROM_bookmarkbitmap",
345,   "ROM_actionbitmap",
346,   "ROM_onlinebitmap",
347,   "ROM_cardbitmap",
348,   "ROM_dailybitmap",
349,   "ROM_a2zbitmap",
350,   "ROM_zero2ninebitmap",
351,   "ROM_bookbitmap",
352,   "ROM_switchbitmap",
353,   "ROM_assistant",
354,   "protonavigator",
355,   "protoirendpoint",
356,   "protoserialendpoint",
357,   "protomodemendpoint",
358,   "protoadspendpoint",
359,   "ROM_compatiblefinder",
360,   "ROM_namesoverview",
361,   "ROM_nameseditview",
362,   "ROM_notesoverview",
363,   "ROM_cardaction",
364,   "ROM_cardview",
365,   "ROM_addressview",
366,   "ROM_primarynameview",
367,   "ROM_secondarynameview",
```

```
        368, "ROM_phoneview",
        369, "ROM_namesstylepop"];

// Have to do this for the validity test since compile does
not know about magic ptrs
            if HasSlot(vars, 'testing) and vars.testing then
                return $@ & (ref div 4);

description := TableLookup(mpt, ref div 4);
        if description = nil then
            description := $# & MakeHexLong(ref);

return description;
    end,
PrintViewFlags:
  func(vf)
  begin
      local s := "";

if not vf then
            return "NIL";

if vf = vNoFlags then
         return "vNoFlags";

if band(vf, vVisible) <> 0 then
         s := " + vVisible";
      if band(vf, vReadOnly) <> 0 then
         s := s & " + vReadOnly";
      if band(vf, vApplication) <> 0 then
         s := s & " + vApplication";
      if band(vf, vCalculateBounds) <> 0 then
         s := s & " + vCalculateBounds";
      if band(vf, vNoKeys) <> 0 then
         s := s & " + vNoKeys";
      if band(vf, vClipping) <> 0 then
         s := s & " + vClipping";
      if band(vf, vFloating) <> 0 then
         s := s & " + vFloating";
      if band(vf, vWriteProtected) <> 0 then
         s := s & " + vWriteProtected";

//    if band(vf, vAnythingFlagMask) = 0 then
//        s := s & " + vNothingAllowed"
//    else
      if band(vf, vAnythingFlagMask) <> 0 then
      begin
         if band(vf, vSingleUnit) <> 0 then
            s := s & " + vSingleUnit";
         if band(vf, vClickable) <> 0 then
            s := s & " + vClickable";
         if band(vf, vStrokesAllowed) <> 0 then
            s := s & " + vStrokesAllowed";
         if band(vf, vGesturesAllowed) <> 0 then
            s := s & " + vGesturesAllowed";
         if band(vf, vCharsAllowed) <> 0 then
            s := s & " + vCharsAllowed";
         if band(vf, vNumbersAllowed) <> 0 then
            s := s & " + vNumbersAllowed";
         if band(vf, vLettersAllowed) <> 0 then
            s := s & " + vLettersAllowed";
         if band(vf, vPunctuationAllowed) <> 0 then
            s := s & " + vPunctuationAllowed";
```

```
                if band(vf, vShapesAllowed) <> 0 then
                    s := s & " + vShapesAllowed";
                if band(vf, vMathAllowed) <> 0 then
                    s := s & " + vMathAllowed";
                if band(vf, vPhoneField) <> 0 then
                    s := s & " + vPhoneField";
                if band(vf, vDateField) <> 0 then
                    s := s & " + vDateField";
                if band(vf, vTimeField) <> 0 then
                    s := s & " + vTimeField";
                if band(vf, vAddressField) <> 0 then
                    s := s & " + vAddressField";
                if band(vf, vNameField) <> 0 then
                    s := s & " + vNameField";
                if band(vf, vCapsRequired) <> 0 then
                    s := s & " + vCapsRequired";
                if band(vf, vCustomDictionaries) <> 0 then
                    s := s & " + vCustomDictionaries";
            end;

if band(vf, vSelected) <> 0 then
                s := s & " + vSelected";
            if band(vf, vClipboard) <> 0 then
                s := s & " + vClipboard";
            if band(vf, vNoScripts) <> 0 then
                s := s & " + vNoScripts";

return SubStr(s, 3, StrLen(s) - 3);
        end,
    MatchLoop:
        func native(frags)
        begin
            local curFrag;
            local nextFrag;
            local brAddr;

local AddrTest := func(val, item) item[kfaddr] = val;

// loop constructs
            for curFrag := 0 to Length(frags) - 1 do
                if frags[curFrag][kfSymbol] = 'bra and
frags[curFrag][kfaddr] > frags[curFrag][kfBranch] then
                    begin
        if vars.debug = 'dumploop or vars.debug = 'dumpall then
        begin
        if vars.debug = 'dumpall then print("loop construct");
        print(frags);
        print(curFrag);
        end;
                        frags[curFrag][kfText] := "end";
                        brAddr := frags[curFrag][kfBranch];
                        frags[curFrag][kfSymbol] := 'looop;
                        nextFrag := ArrayPos(frags, brAddr, 0, AddrTest);
                        if nextFrag then
                        begin
                            frags[nextFrag][kfaddr] := frags[nextFrag][kfaddr] +
1;
                            AddArraySlot(frags, [frags[nextFrag][kfaddr] - 1,
"loop\n\tbegin", 0, 'looop]);
                            Sort(frags, '|<|, func (e) e[0]);
                        end;
                    end;
        end,
```

```
    MakeValidSymbol:
      func(s)
      begin
            local t := "";
            local doBracket := nil;
            local i;

// verify start of symbol is correct
            if not (UpCase(s[0]) >= $A and UpCase(s[0]) <= $Z) and s[0]
<> $_ then
                    doBracket := true;

// Handle arithmetic functions
            if StrEqual("mod", s) or StrEqual("div", s) then
                    doBracket := true;

// scan and replace illegal characters
            for i := 0 to StrLen(s) - 1 do
            begin
                    if s[i] = $| then
                    begin
                            t := t & "\\|";
                            doBracket := true;
                    end
                    else
                    begin
                            if not (UpCase(s[i]) >= $A and UpCase(s[i]) <=
$Z) and s[i] <> $_ and not (s[i] >= $0 and s[i] <= $9) then
                                    doBracket := true;
                            t := t & s[i];
                    end;
            end;
            if doBracket and t[0] <> ${ then
                    t := $| & t & $|;
            return t;
      end;,
    printFrame:
      func(f)
      begin
          local s := "{";
          local curDepth := GetGlobals().curDepth;
          local ref := refof(f);

if ref mod 4 = 3 and ref div 4 < 500 and curDepth > 0 then
             return PrintMagicPtr(ref);

if curDepth = nil then
          begin
             SetGlobal(0, 'curDepth);
             curDepth := 0;
          end
          else if curDepth = printdepth + 1 then
             return s & $# & MakeHexLong(ref) & $};
          else
             SetGlobal(curDepth + 1, 'curDepth);

foreach slot, val in f do
          begin
             s := s & slot & ": ";
             if PrimClassOf(val) = 'Frame then
             begin
                if ClassOf(val) = 'CodeBlock then
                   s := s & DumpCode(val);
```

```
                    else
                        s := s & PrintFrame(val);
                end;
                else if PrimClassOf(val) = 'Array then
                    s := s & PrintArray(val);
                else if slot = 'viewFlags then
                    s := s & PrintViewFlags(val);
                else if slot = 'viewFont then
                    s := s & PrintViewFont(val);
                else if slot = 'viewFormat then
                    s := s & PrintViewFormat(val);
                else if slot = 'viewJustify then
                    s := s & PrintViewJustify(val);
                else if slot = 'viewClass then
                    s := s & PrintViewClass(val);
                else
                    s := s & SPrintObject(val);
                if curDepth = 0 then
                    s := s & ",\n";
                else
                    s := s & ", ";
            end;

if StrLen(s) = 1 then
                s := "{}";
            else
            begin
                s[StrLen(s) - 2] := $};
                s[StrLen(s) - 1] := $\u0020;
            end;

SetGlobal(curDepth, 'curDepth);

return s;
        end,
PrintViewJustify:
    func(vj)
    begin
        local s := "";
        local v;

if not vj then
            return "NIL";

v := band(vj, vjHMask);
        if v <> 0 then
        begin
            if v = vjLeftH then
                s := " + vjLeftH";
            else if v = vjRightH then
                s := " + vjRightH";
            else if v = vjCenterH then
                s := " + vjCenterH";
            else if v = vjFullH then
                s := " + vjFullH";
        end;

v := band(vj, vjVMask);
        if v <> 0 then
        begin
            if v = vjTopV then
                s := s & " + vjTopV";
            else if v = vjCenterV then
```

```
                    s := s & " + vjCenterV";
                else if v = vjBottomV then
                    s := s & " + vjBottomV";
                else if v = vjFullV then
                    s := s & " + vjFullV";
            end;

if band(vj, vjParentMask) <> 0 or band(vj, vjSiblingMask) = 0
then
            begin
                v := band(vj, vjParentHMask);
                    if v <> 0 then
                    begin
                        if v = vjParentLeftH then
                            s := s & " + vjParentLeftH";
                        else if v = vjParentCenterH then
                            s := s & " + vjParentCenterH";
                        else if v = vjParentRightH then
                            s := s & " + vjParentRightH";
                        else if v = vjParentFullH then
                            s := s & " + vjParentFullH";
                    end;

v := band(vj, vjParentVMask);
                    if v <> 0 then
                    begin
                        if v = vjParentTopV then
                            s := s & " + vjParentTopV";
                        else if v = vjParentCenterV then
                            s := s & " + vjParentCenterV";
                        else if v = vjParentBottomV then
                            s := s & " + vjParentBottomV";
                        else if v = vjParentFullV then
                            s := s & " + vjParentFullV";
                    end;
            end;

if band(vj, vjSiblingMask) <> 0 then
            begin
                    v := band(vj, vjSiblingHMask);
                    if v <> 0 then
                    begin
                        if v = vjSiblingNoH then
                            s := s & " + vjSiblingNoH";
                        else if v = vjSiblingCenterH then
                            s := s & " + vjSiblingCenterH";
                        else if v = vjSiblingRightH then
                            s := s & " + vjSiblingRightH";
                        else if v = vjSiblingFullH then
                            s := s & " + vjSiblingFullH";
                        else if v = vjSiblingLeftH then
                            s := s & " + vjSiblingLeftH";
                    end;

v := band(vj, vjSiblingVMask);
                if v <> 0 then
                begin
                    if v = vjSiblingNoV then
                        s := s & " + vjSiblingNoV";
                    else if v = vjSiblingCenterV then
                        s := s & " + vjSiblingCenterV";
                    else if v = vjSiblingBottomV then
                        s := s & " + vjSiblingBottomV";
```

```
                    else if v = vjSiblingFullV then
                        s := s & " + vjSiblingFullV";
                    else if v = vjSiblingTopV then
                        s := s & " + vjSiblingTopV";
                    end;
            end;

if band(vj, vjChildrenLasso) <> 0 then
                s := s & " + vjChildrenLasso";
            if band(vj, vjReflow) <> 0 then
                s := s & " + vjReflow";

v := band(vj, lineLimitMask);
            if v <> 0 then
            begin
                    if v = noLineLimits then
                        s := s & " + noLineLimits";
                    else if v = oneLineOnly then
                        s := s & " + oneLineOnly";
                    else if v = oneWordOnly then
                        s := s & " + oneWordOnly";
                    else if v = oneCharOnly then
                        s := s & " + oneCharOnly";
                    else if v = noLineCompaction then
                        s := s & " + noLineCompaction"
               end;

return SubStr(s, 3, StrLen(s) - 3);
        end,
    SPrintObject:
      func(f)
      begin
            //EnableProfiling(true);
            local s := "";
            local curDepth := GetGlobals().curDepth;

if curDepth = nil or curDepth < 0 then
            begin
                SetGlobal(0, 'curDepth);
                curDepth := 0;
            end
            else if curDepth = printdepth + 2 then
                return "\u2026\u";
            else
                SetGlobal(curDepth + 1, 'curDepth);

if f = nil then
                s := "nil";
            else if PrimClassOf(f) = 'Frame then
            begin
                if ClassOf(f) = 'CodeBlock then
                    s := DumpCode(f);
                else
                    s := PrintFrame(f);
            end;
            else if PrimClassOf(f) = 'Array then
                s := PrintArray(f);
            else if PrimClassOf(f) = 'Binary and ClassOf(f) <> 'Symbol and
ClassOf(f) <> 'String then
                s := $< & ClassOf(f) & ", length " & length(f) & $>;
            else if ClassOf(f) = 'Boolean then
                s := if f then "true" else "nil";
            //else if ClassOf(f) = 'Symbol then
```

82

```
//    s := s & $' & f;
        else if ClassOf(f) = 'String and curDepth <> 0 then
           s := s & $" & f & $";
        else
           s := s & f;

if curDepth = 0 then
           SetGlobal(-1, 'curDepth);
        else
           SetGlobal(curDepth, 'curDepth);
        //EnableProfiling(nil);

return s;
     end;,
  PrettyUpFunc:
     func native(s)
     begin
           local i, j := 0;
           local lines := [];
           local indent := 0;
           local tabs := "\t\t\t\t\t\t\t\t\t\t";
           local spaces := "                                        ";
           constant cr := "\n";
           constant crtab := "\n\t";

// remove all tabs from the text
           i := StrPos(s, crtab, 0);
           while i do
           begin
                 s := StrMunger(s, i + 1, 1, nil, 0, 0);
                 i := StrPos(s, crtab, 0);
           end;

// convert the text into an array of lines
           i := StrPos(s, cr, 0);
           while i do
           begin
                 if i > 0 then
                       AddArraySlot(lines, SubStr(s, 0, i));
                 else
                       AddArraySlot(lines, "");
                 s := StrMunger(s, 0, i + 1, nil, 0, 0);
                 i := StrPos(s, cr, 0);
           end;
           AddArraySlot(lines, s);

// remove useless begin end pairs
           i := 0;
           while i < Length(lines) - 3 do
           begin
                 if StrEqual("begin", lines[i]) and StrEqual("end",
SubStr(lines[i + 2], 0, 3)) then
                    begin
                          ArrayRemoveCount(lines, i + 2, 1);
                          ArrayRemoveCount(lines, i, 1);
                    end;
                 i := i + 1;
           end;

// remove useless else nil pairs
           i := 0;
           while i < Length(lines) - 2 do
```

```
                    if BeginsWith(lines[i], "else") and BeginsWith(lines[i
+ 1], "nil") then
                            ArrayRemoveCount(lines, i, 2);
                    else
                            i := i + 1;

// convert the array back into a string
            s := "";
            for i := 0 to Length(lines) - 1 do
            begin
                    if BeginsWith(lines[i], "end") or BeginsWith(lines[i],
"until") then
                            indent := indent - 1;
                    if vars.useTabs then
                            s := s & SubStr(tabs, 0, indent) & lines[i] &
$\n;
                    else
                            s := s & SubStr(spaces, 0, indent * 3) &
lines[i] & $\n;
                    indent := indent - j;
                    j := max(0, j - 1);
                    if StrEqual("begin", lines[i]) or StrEqual("repeat",
lines[i]) then
                            indent := indent + 1;
                    else if (EndsWith(lines[i], "do") or
EndsWith(lines[i], "then") or EndsWith(lines[i], "else")) and not
StrEqual("begin", lines[i + 1]) then
                            begin
                                    indent := indent + 1;
                                    j := j + 1;
                            end
            end;

return s;
        end
    };

_view000 :=
    {viewFlags: 1,
     viewFormat: 257,
     viewLineSpacing: 14,
     viewFont: tsSize(10) + tsBold,
     viewBounds: {left: 6, top: 14, right: 166, bottom: 86},
     text: "Programmers Helper\n\nDO NOT DISTRIBUTE!\nClaris
Confidential",
     viewClass: 81
    };
AddStepForm(JokeView, _view000);

constant |layout_Helper.t| := JokeView;
// End of file Helper.t

InstallScript := func(package)
begin
    functions.DumpCode := theForm.DumpCode;
    functions.DumpHex := theForm.DumpHex;
    functions.MakeHexByte := theForm.MakeHexByte;
    functions.MakeHexWord := theForm.MakeHexWord;
```

```
        functions.MakeHexLong := theForm.MakeHexLong;
        functions.PrintPathExpr := theForm.PrintPathExpr;
        functions.PrintViewFlags := theForm.PrintViewFlags;
        functions.PrintViewFont := theForm.PrintViewFont;
        functions.PrintViewFormat := theForm.PrintViewFormat;
        functions.PrintViewJustify := theForm.PrintViewJustify;
        functions.PrintViewClass := theForm.PrintViewClass;
        functions.PrintMagicPtr := theForm.PrintMagicPtr;
        functions.PrintArray := theForm.PrintArray;
        functions.PrintFrame := theForm.PrintFrame;
        functions.Disasm := theForm.Disasm;
        functions.GetFirstWord := theForm.GetFirstWord;
        functions.GetLastWord := theForm.GetLastWord;
        functions.GetIterator := theForm.GetIterator;
        functions.MakeLineArray := theForm.MakeLineArray;
        functions.PrettyUpFunc := theForm.PrettyUpFunc;
        SetGlobal(functions.SPrintObject, 'oldSprintObject);
        functions.SPrintObject := theForm.SPrintObject;
        functions.MakeValidSymbol := theForm.MakeValidSymbol;
        functions.MatchOnException := theForm.MatchOnException;
        functions.MatchLoop := theForm.MatchLoop;
        if HasSlot(GetRoot(), '|ViewFrame:JRH|) then
    begin
            GetRoot().|ViewFrame:JRH|.decompile := func(block, indent)
            begin
                sprintobject(block);
            end;
            GetRoot().|ViewFrame:JRH|.stepChildren :=
Clone(GetRoot().|ViewFrame:JRH|.stepChildren);
            GetRoot().|ViewFrame:JRH|.stepChildren[14] :=
Clone(GetRoot().|ViewFrame:JRH|.stepChildren[14]);
            GetRoot().|ViewFrame:JRH|.stepChildren[14].buttonClickScript
:= func()
            begin
                    local s := "";

foreach val in scroller:ChildViewFrames() do
                        s := s & val.text & $\n;

if GetRoot().(editorSym) exists then
                begin
                    GetRoot().(editorSym):Open();
                    SetValue(GetRoot().(editorSym).EditArea, 'text, s);
                    base:Close();
                end;
                else
                    self:notify(4, Clone("ViewFrame"), Clone("ViewFrame
Editor not found"));
            end;
    end;
end;

RemoveScript := func(package)
begin
    RemoveSlot(functions, 'DumpCode);
    RemoveSlot(functions, 'MakeHexByte);
    RemoveSlot(functions, 'MakeHexWord);
    RemoveSlot(functions, 'MakeHexLong);
    RemoveSlot(functions, 'PrintPathExpr);
    RemoveSlot(functions, 'PrintViewFlags);
    RemoveSlot(functions, 'PrintViewFont);
    RemoveSlot(functions, 'PrintViewFormat);
    RemoveSlot(functions, 'PrintViewJustify);
```

85

```
    RemoveSlot(functions, 'PrintViewClass);
    RemoveSlot(functions, 'PrintMagicPtr);
    functions.SPrintObject := vars.OldSPrintObject;
    RemoveSlot(GetGlobals(), 'OldSprintObject);
    RemoveSlot(functions, 'PrintArray);
    RemoveSlot(functions, 'PrintFrame);
    RemoveSlot(functions, 'Disasm);
    RemoveSlot(functions, 'GetFirstWord);
    RemoveSlot(functions, 'GetLastWord);
    RemoveSlot(functions, 'GetIterator);
    RemoveSlot(functions, 'MakeLineArray);
    RemoveSlot(functions, 'PrettyUpFunc);
    RemoveSlot(functions, 'MakeValidSymbol);
    RemoveSlot(functions, 'MatchOnException);
    RemoveSlot(functions, 'MatchLoop);
end;
```

What is claimed is:

1. A computer-implemented process for decompiling a compiled interpretive code into a source language comprising the steps of:
    creating an array of names and an array of literals from information stored in a compiled frame object, said compiled frame object including a plurality of compiled, interpretive code bytes;
    sequentially converting each of said code bytes utilizing said code byte, said array of names, and said array of literals, into a code fragment and adding said code fragment to a code fragment array;
    performing pattern matching on said code fragment array to produce a source language listing describing a high-level functioning of said code bytes, said pattern matching including a linear sequence of matching steps that are ordered such that matching steps of less ambiguity are performed prior to related matching steps of greater ambiguity.

2. A computer-implemented process as recited in claim 1 wherein said process is implemented on a pen-based computer system.

3. A computer-implemented process as recited in claim 2 wherein said process is implemented on a frame-based computer system.

4. A computer-implemented process as recited in claim 2 wherein said step of creating an array of names and an array of literals includes storing each name from said frame object as a string in said array of names, and storing each literal from said frame object as a string in said array of literals.

5. A computer-implemented process as recited in claim 2 wherein said step of converting each byte code into a code fragment includes creating a stack structure to store values during said code fragment creation.

6. A computer-implemented process as recited in claim 2 wherein said step of converting each byte code into a code fragment includes indexing said array of names and said array of literals to retrieve a textual portion of said code fragment.

7. A computer-implemented process as recited in claim 6 wherein said step of performing pattern matching on said code fragment array includes creating an array of names from information in said frame object and utilizing said array of names to create said source language.

8. A computer-implemented process as recited in claim 7 wherein said step of performing pattern matching on said code fragment array includes searching for at least one pattern in said code fragment array for each known construct used in said source language and performing actions to modify the text of a code fragment having said matched pattern in accordance with said construct to provide said source language listing.

9. A computer-implemented process as recited in claim 8 wherein said step of performing pattern matching on said code fragment array includes setting a scan direction and adding each code fragment in said code fragment array in said scan direction until a pattern is matched.

10. A computer-implemented process as recited in claim 7 wherein cleanup procedures are implemented after all known constructs have been matched in said code fragment array to provide said source language listing.

11. A computer-implemented process as recited in claim 1 wherein said step of performing pattern matching on said code fragment array to produce a source language listing includes inserting text specific to matched constructs to the source language listing.

12. A decompiler for a compiled interpretive code comprising:
    a memory store for storing a plurality of compiled, interpretive code bytes;
    a code fragment array generator for converting said code bytes into a code fragment array and for storing said code fragment array in said memory store; and
    a pattern matcher operating on said code fragment array to produce a source language describing the high-level functioning of said code bytes and for storing said source language in said memory store.

13. A decompiler as recited in claim 12 wherein said code fragment array generator creates a plurality of code fragments from said code bytes and creates said code fragment array from said code fragments.

14. A decompiler as recited in claim 13 wherein said code fragment array generator creates an array of names and an array of literals to create said plurality of code fragments, said names, said literals, and said code bytes being stored in a frame object.

15. A decompiler as recited in claim 13 wherein said code fragment array generator utilizes said memory store to create a stack structure during said creation of said code fragments.

16. A decompiler as recited in claim 12 wherein said pattern matcher matches code fragments in said code fragment array with patterns which distinguish each type of construct used in said source language.

17. A decompiler as recited in claim 15 wherein said pattern matcher first matches said constructs having more complex patterns.

18. A decompiler as recited in claim 17 wherein said pattern matcher includes a function text generator which adds source language text appropriate for each of said matched constructs.

* * * * *